(12) United States Patent
Brown et al.

(10) Patent No.: US 10,057,228 B2
(45) Date of Patent: Aug. 21, 2018

(54) REGISTERING CONTENT TO A DIGITAL LOCKER

(71) Applicant: CINRAM GROUP, INC., Phoenix, AZ (US)

(72) Inventors: Steve Brown, Toronto (CA); John Crosier, Burbank, CA (US); Paul Savage, Scranton, PA (US); Sean Mancuso, Moosic, PA (US); Robert McAndrew, Olyphant, PA (US); Jeff Williams, Archbald, PA (US)

(73) Assignee: CT ACQUISITION HOLDCO, LLC, Phoenix, AZ (US)

( * ) Notice: Subject to any disclaimer, the term of this patent is extended or adjusted under 35 U.S.C. 154(b) by 0 days.

(21) Appl. No.: 14/689,846

(22) Filed: Apr. 17, 2015

(65) Prior Publication Data

US 2015/0304296 A1 Oct. 22, 2015

Related U.S. Application Data

(60) Provisional application No. 61/980,945, filed on Apr. 17, 2014, provisional application No. 61/988,653, filed on May 5, 2014.

(51) Int. Cl.
*H04L 29/06* (2006.01)
*G06F 21/60* (2013.01)
*G06F 21/10* (2013.01)

(52) U.S. Cl.
CPC ............. *H04L 63/08* (2013.01); *G06F 21/10* (2013.01); *G06F 21/604* (2013.01); *H04L 2463/101* (2013.01); *H04L 2463/102* (2013.01)

(58) Field of Classification Search
CPC ......... H04L 2463/101; H04L 2463/102; H04L 63/08; H04L 63/083; H04L 63/0815; H04L 63/0823; G06F 21/10; G06F 21/604; G06F 21/31
USPC .................................................. 726/5
See application file for complete search history.

(56) References Cited

U.S. PATENT DOCUMENTS

| | | |
|---|---|---|
| 7,174,455 B1 | 2/2007 | Arnold et al. |
| 7,200,575 B2 | 4/2007 | Hans et al. |
| 7,380,280 B2 | 5/2008 | de Jong |
| 7,444,306 B2 | 10/2008 | Varble |
| 7,457,780 B2 | 11/2008 | Kimura et al. |
| 7,529,712 B2 | 5/2009 | Heaven et al. |
| 7,627,892 B2 | 12/2009 | Lin et al. |
| 7,698,570 B2 | 4/2010 | Schumann et al. |
| 7,845,014 B2 | 11/2010 | Siegel |
| 7,873,578 B2 | 1/2011 | Johnson et al. |
| 7,975,312 B2 | 7/2011 | Broderson et al. |

(Continued)

FOREIGN PATENT DOCUMENTS

WO    WO 2013/103568 A1    7/2013

*Primary Examiner* — Baotran N To
(74) *Attorney, Agent, or Firm* — Cooper & Dunham LLP

(57) ABSTRACT

An approach is provided for registering specific content in a portable storage medium to a digital locker. The portable storage medium is configured to include a content access application which causes the user interface to display a content access and registration part on a terminal executing the content access application, to request user entry of access validation information associated with the specific content. Upon access validation, the specific content can be registered to the digital locker of the user.

16 Claims, 29 Drawing Sheets

(56) References Cited

U.S. PATENT DOCUMENTS

| | | | |
|---|---|---|---|
| 8,108,312 B2 | 1/2012 | Natsuno | |
| 8,190,918 B2 | 5/2012 | Robert et al. | |
| 8,230,518 B2 | 7/2012 | de Jong | |
| 8,286,229 B2 | 10/2012 | Bodin et al. | |
| 8,321,352 B1 | 11/2012 | Rameshkumar et al. | |
| 8,452,016 B2 | 5/2013 | Robert et al. | |
| 8,458,040 B2 | 6/2013 | Rothschild et al. | |
| 8,600,897 B2 | 12/2013 | Chatani | |
| 8,646,102 B2 | 2/2014 | Fernando et al. | |
| 8,661,557 B2 | 2/2014 | Ellis et al. | |
| 2005/0091164 A1* | 4/2005 | Varble | G06F 21/10 705/52 |
| 2011/0225417 A1* | 9/2011 | Maharajh | G06F 21/10 713/150 |
| 2012/0251077 A1* | 10/2012 | Stewart | H04N 5/913 386/253 |
| 2013/0006869 A1 | 1/2013 | Grab et al. | |
| 2013/0007443 A1 | 1/2013 | Grab et al. | |
| 2013/0239233 A1 | 9/2013 | Robert et al. | |

\* cited by examiner

REGISTERING CONTENT TO A DIGITAL LOCKER

CROSS-REFERENCE TO RELATED APPLICATIONS

This application claims the benefit of U.S. Provisional Application No. 61/980,945 filed on Apr. 17, 2014 and U.S. Provisional Application No. 61/988,653 filed on May 5, 2014, each entitled "REGISTERING CONTENT TO A DIGITAL LOCKER".

TECHNICAL FIELD

This disclosure relates to an approach to make content available to a user through any of various terminals that the user may use, and more particularly, such approach that includes registering content in a portable storage medium to a digital locker.

BACKGROUND

Digital media is playing an increasingly greater role in our society. For example, digital media makes it possible to enjoy content (such as audio and/or video content), in any of various available ways today, such as through compact disc (CD), digital versatile disc (DVD) and Blu-ray disc (BD) players reproducing content from optical discs, cable television receivers, network-connected players, etc. For example, forms of entertainment, such as games, music and videos or movies, are more commonplace due to the ease of distribution through the Internet to smartphones, other portable devices, terminals, etc. Consequently, expectations of availability of content are proliferating amongst many content consumers, with the end game being content availability anywhere-anytime.

However, although the Internet is a popular means of obtaining entertainment and other content, some users are hesitant to submit payment through the Internet for such entertainment or content, since information technology (such as packet sniffers, and the like, as well as other elicit techniques) is also used by thugs and thieves to misappropriate identity and other personal information of consumers who conduct transactions through the Internet. Such consumers may prefer to submit payment in person at a retail establishment, where there is a lower risk of having ones identity and/or other personal information hijacked.

Thus, there remains a need for a better way for a user, when required, to pay for content and then to be able to access such content conveniently (and virtually) anytime, anywhere.

BRIEF SUMMARY

This disclosure provides an approach for a content consumer to access the desired content, without having to conduct a purchase or rental transaction through the Internet (and thereby compromising personal information of the consumer). More specifically, the consumer obtains a portable recording (or storage) medium through a retail establishment or by mail (or similar conventional channel), and registers the content associated with the portable recording medium to a digital locker of the consumer. The contents registered in such digital locker can be accessed by the consumer through any of various terminals that the user may use.

In an aspect of this disclosure, the portable recording medium is configured to store a content access application which includes a user interface module to cause a content access and registration part (such as in a menu, or another type of user interface) to be displayed on a terminal executing the content access application, and request user entry of access validation information associated with the specific content. For example, when the user selects or otherwise activates the part, a connection to an access validation authority is established. The user interface may request entry of the access validation information (e.g., a unique, or serial, code associated with, and applied during manufacturing to, the portable recording medium) before or after the connection to the access validation authority is established. Upon access validation, access by the consumer to the specific content in his or her digital locker is activated.

In another aspect of this disclosure, upon validation, content access is allowed via the consumer's digital locker (e.g., associated with the consumer's user credentials). Thus, even in the instance that the transaction (e.g., purchase, rental, etc.) to acquire access to the content is performed through conventional channels (such as, for example, a brick-and-mortar retail establishment), the consumer can register the acquired access rights in the digital locker and thereafter content access is unlocked or activated for the consumer to access the content from virtually anywhere and anytime (so long as a network connection is available to the consumer).

In another aspect of this disclosure, the content is stored on the portable recording medium and upon completion of the transaction (i.e. purchase, rental, etc.), the consumer can proceed to reproduce the content from the portable medium. On the other hand, upon registration of the content to the consumer's digital content, such registered content becomes accessible by the consumer even without physical possession of the portable medium, so long as the consumer has a terminal and network connection to access the digital locker.

In another aspect of this disclosure, upon access validation, the consumer can specify any of various possible content platforms from which the consumer may wish to access the content. Upon such registration, the specific content becomes retrievable via the digital locker, upon entry of the user credentials, for reproduction on any of the various network terminals that the user can operate. Further, even if a particular platform was not specified at the time of initial registration, the consumer may be permitted to add an additional platform via the digital locker, at a later time.

The approach described herein also benefits the content provider in that the content can be marketed as being available from any of the various popular digital media, while network access to the content is controlled via a registration and activation process and thus can limit access to those who have properly procured access rights. Conversely, possession of the portable medium permits the consumer to reproduce the content stored in one or more content storage portions of the portable recording medium. Therefore, the content can be marketed in the conventional manner (i.e. via retail establishment).

BRIEF DESCRIPTION OF THE DRAWINGS

The aforementioned and other aspects, features and advantages can be more readily understood from the following detailed description with reference to the accompanying drawings wherein.

DETAILED DESCRIPTION

Figure 1:
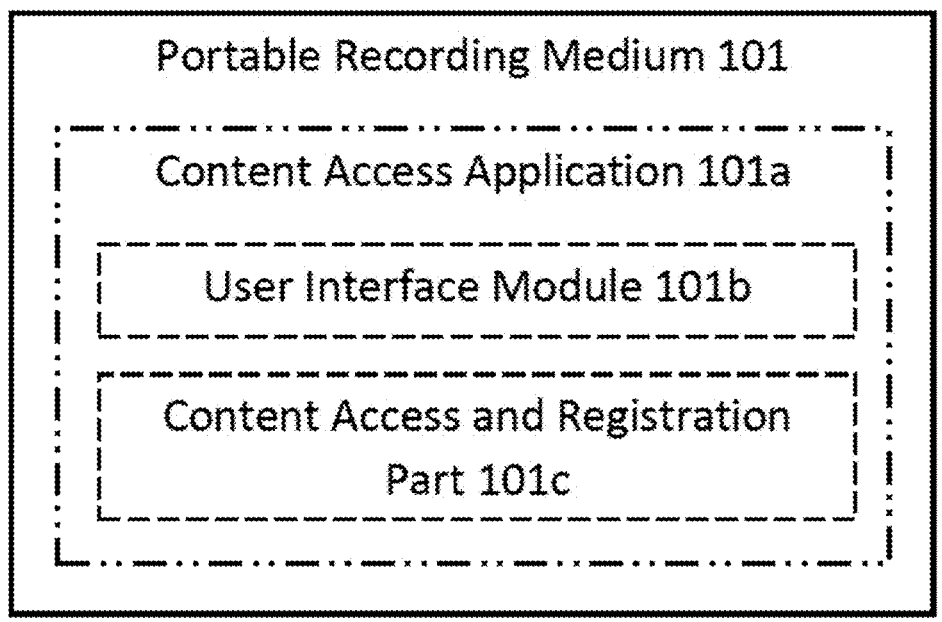
FIG. 1 shows a block diagram of a portable recording medium configured for content to be registered to a digital locker, according to an exemplary embodiment.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations is omitted where it may obscure the inventive aspects discussed in this disclosure. Referring now to the drawings, wherein like reference numerals designate identical or corresponding parts throughout the several views, an improved approach to market content via use of a portable recording medium is described below.

FIG. 1 shows schematically a block diagram of a portable recording medium 101 in which a content access application 101a, a user interface module 101b and a content access and registration part 101c are embodied in the recording medium 101. Exemplary embodiments of the portable recording medium 101 are discussed herein with reference to an optical storage disc (e.g., CD disc, MD disc, BD disc, etc.). However, it should be appreciated that other recording media can be configured to include the features described herein.

In a case that the portable recording medium 101 is an optical disc, such as a BD disc or DVD disc, a process called authoring may be used to develop an image to be replicated on the optical discs. Authoring includes gathering from content sources (and creating) source materials including video assets, audio assets, menu content, still pictures, video stills, sub-pictures, and subtitle text, formulating information for video title set, video management, presentation control and data search, and determining and embedding functionality into the menus, sub-pictures, program chain information files, and video objects. Such content elements are typically assembled (into a content hierarchy or roadmap), synchronized, and encoded, and then an optical disc application (that is, a self-contained and self-organized package of content which, when embodied on an optical disc inserted in a media player, commences playing at the start of the package and then stops at the end, assuming no intervening user control) is created. An authoring tool can be used to guide a user through the authoring process, including flagging one or more area(s) on the medium to be ignored by the media player, and inserting data in specified locations (relative to content to be reproduced by a media player). After the application is completed, a pre-mastering software tool can be used to generate a disc image, and then store the disc image on appropriate media The content access application 101a may be an application that contains a set of instructions, such as, for example, Blu-ray Disc Java (BD-J) code, on the portable recording medium 101 that causes a media player to perform a certain set of actions when the portable recording medium 101 is played on the media player. In other words, the application allows the user to access specific content on the portable recording medium 101 via the media player. The application may be inserted along with the content in an optical disc. On the other hand in a storage device such as flash drive, the application may be located in a file.

In a case that the application is or includes BD-J code, such code may be written on the Java ME (Java Micro Edition) platform according to the BD-J specification for creating advance content on Blu-ray discs. The BD-J code may be found within a file on the Blu-ray disc and may correspond to a variety of applications that may enhance the user's experience (e.g., subtitles, language options, bonus content, trailers, etc.). Further, the BD-J code may also cause the media player to perform certain tasks such as accessing a website on the Internet, unlocking content, or registering content to a digital locker. This may be performed by presenting to a user interface screen corresponding to an application supported by the BD-J code.

The user interface module 101b causes the media player to present, via a display, interfaces to the user that may show the content access application in a user format (e.g., menu screen, scene selection, etc.) or may cause the content access and registration part 101c to be displayed on the screen for view by the user.

The content access and registration part 101c prompts the user to enter validation information. The validation information may be anything from a series of random or nonsensical alphanumeric characters to several pieces of user information (name, date of birth, age, ID number, etc.) Further, the content access and registration part 101c may include an application supported by BD-J code or a link such as a uniform resource locator (URL) which may cause a media player to access a validation authority to confirm that the validation information entered by the user is correct. In a case that the validation information is verified, the user can register the specific content to his or her digital locker. On the other hand, if the validation information is incorrect, the user is denied the benefit of registering the specific content on to a digital locker.

Figure 2A:
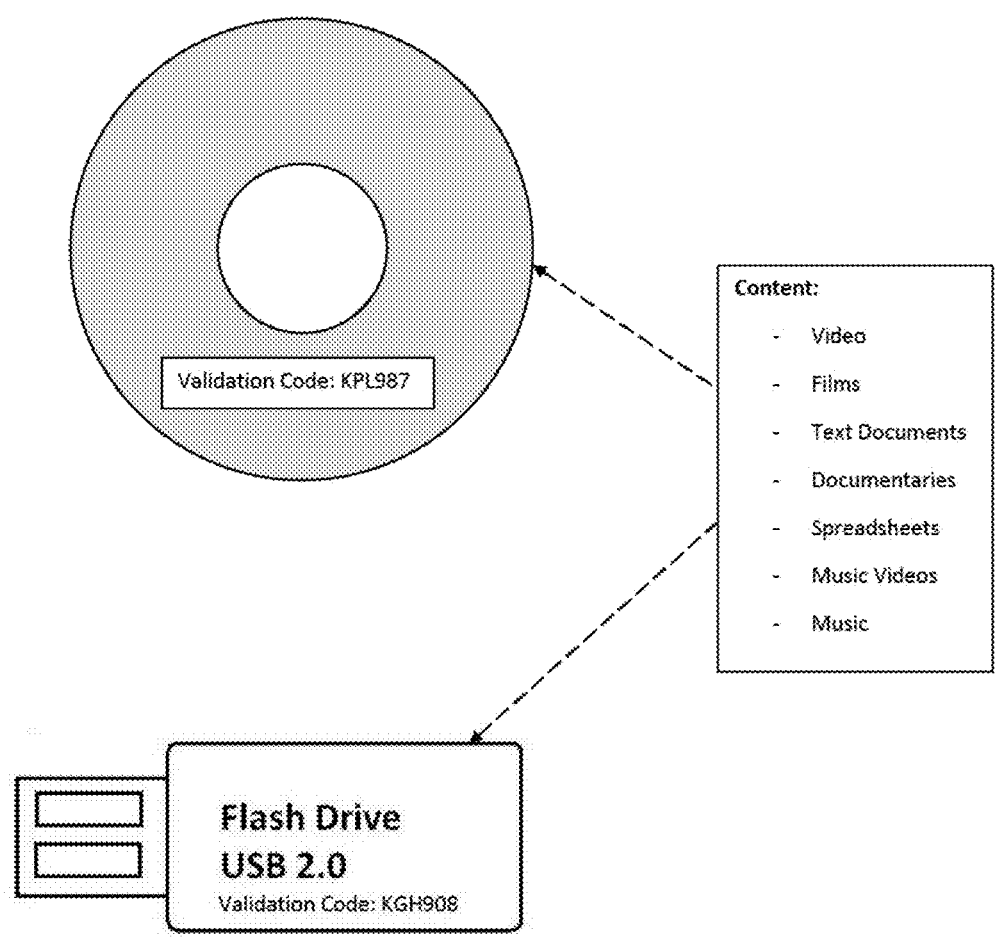
FIG. 2A shows a portable recording medium configured, according to another exemplary embodiment, for content to be registered to a digital locker.

FIG. 2A shows two examples of the portable recording medium 101. In one example, the portable recording medium 101 is an optical disc (e.g., BD, DVD, etc.). In another example, the portable recording medium 101 is a USB flash drive. However, regardless of the form taken by the portable recording medium 101, the stored or recorded contents may be the same and each may have a validation code, which in an exemplary embodiment, is imprinted thereon externally. As a result, when the user is prompted to enter validation information, the user can readily determine the required validation information.

In another exemplary embodiment, the validation codes may be stored inside the portable recording medium. As a result, the user is not required to enter validation information in order to access content on the portable recording medium. Once the portable recording medium is inserted or connected to a media player, the validation codes may be associated with the user's account immediately, thereby allowing the user to have access to the content.

Figure 2B:
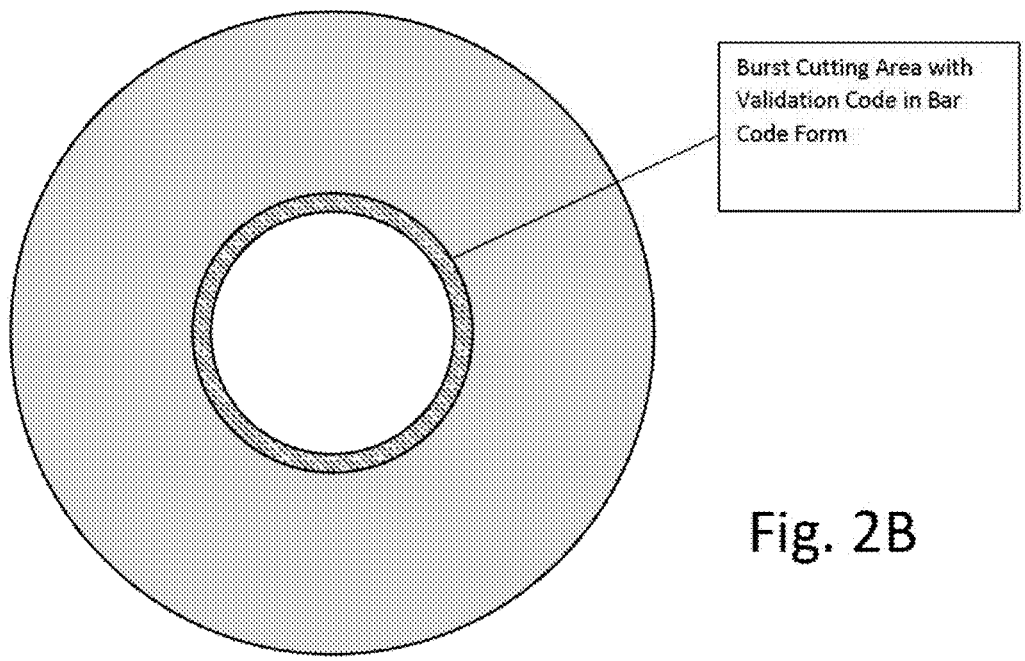
FIG. 2B shows a portable recording medium, according to another exemplary embodiment, in which a validation code is captured as a bar code (or other mark) in a burst cutting area.
Figure 2C:
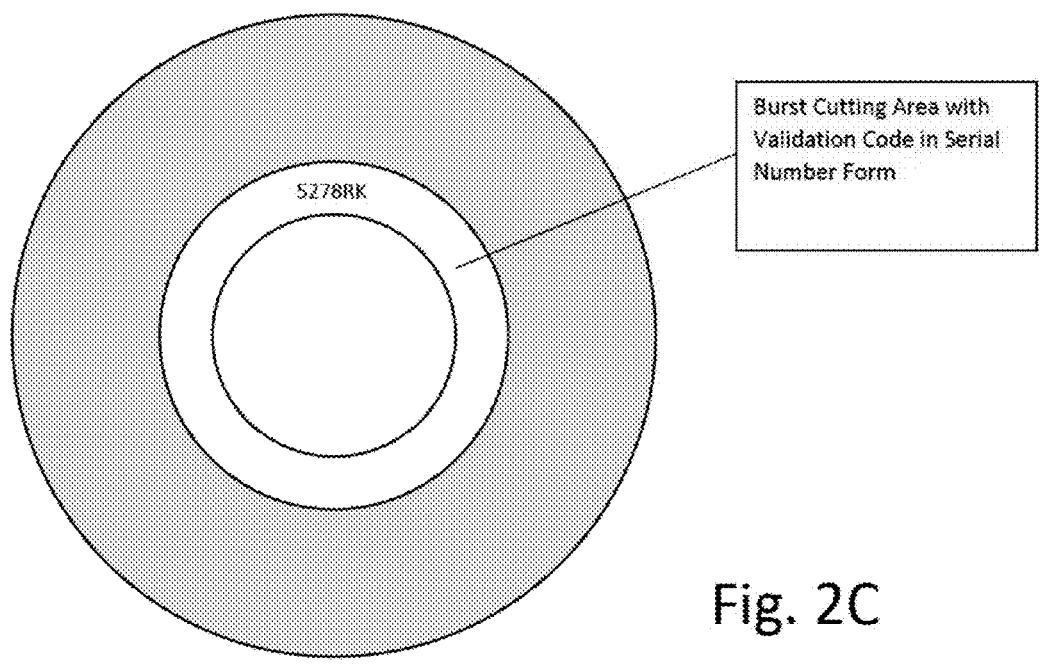
FIG. 2C shows a portable recording medium, according to another exemplary embodiment, in which a validation code is imprinted in a burst cutting area.

FIGS. 2B and 2C show additional examples of a portable recording medium in which it is an optical disc (e.g., BD, DVD, etc.). In the example shown in FIG. 2B, the validation code is written on a burst cutting area (BCA) as a barcode, and in the example shown in FIG. 2C, the validation code is imprinted on the BCA which is disposed near the center of the disc.

Figure 3:
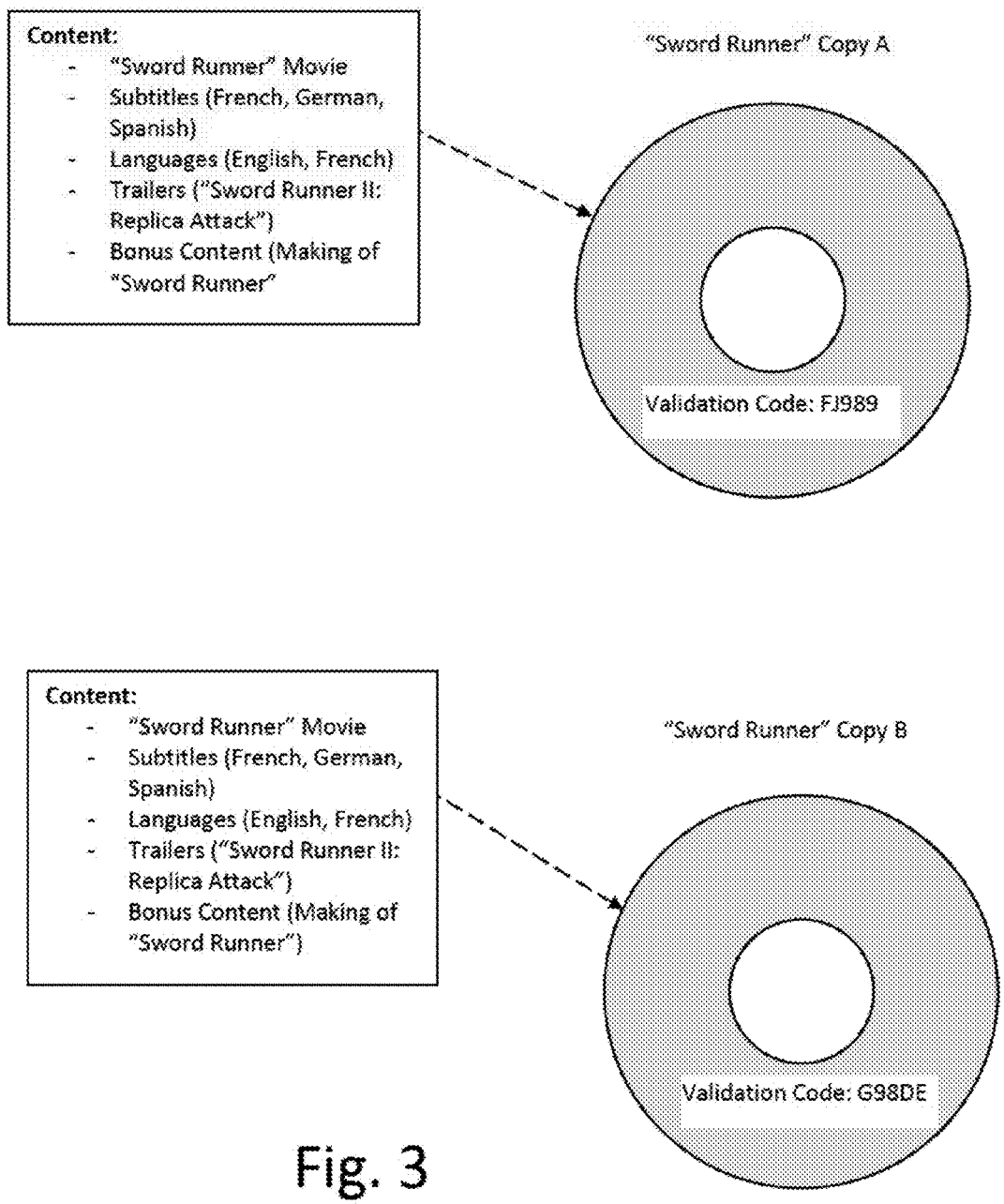
FIG. 3 shows a portable recording medium configured for content to be registered to a digital locker, according to another exemplary embodiment.

In the example shown in FIG. 3, each optical disc contains the same content but a different validation code from the other. In this case, the content includes a movie "Sword Runner", bonus content, trailers, subtitles and language options. Each copy (i.e. A and B) of the movie "Sword Runner" is identical in every aspect. Thus, a person purchasing copy A receives the same experience as another person who has purchased copy B. The main difference between each copy is that for each one, there is a different validation code, so that it is possible to prevent the same disc from being registered to different user accounts.

Figure 4:
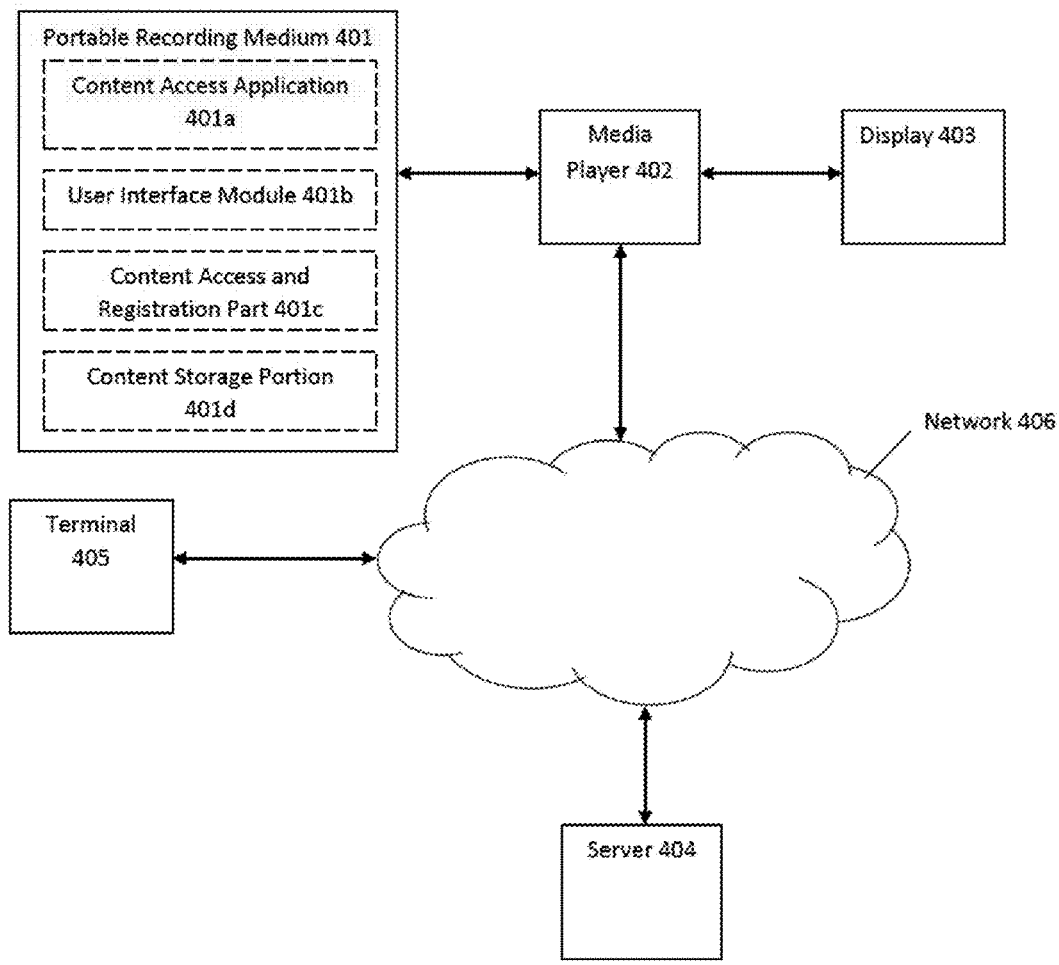
FIG. 4 shows a block diagram of a system, according to an exemplary embodiment, configured for content to be registered to a digital locker.

FIG. 4 shows schematically a system 400 that includes a portable recording medium 401, a media player 402, a display 403, a server 404 and a terminal 405, all of which are interconnected by network 406. Although only one terminal apparatus and server is shown in FIG. 4, it should be understood that the system 400 can include a plurality of user terminal devices and servers (which can have similar or different configurations). Further, the portable recording medium 401, which is substantially similar to the portable recording medium 101 in FIG. 1, additionally comprises a content storage part 101d.

The content storage part 101d of the portable recording medium 401 may comprise one or more storage portions to store specific content. For example, some of the storage portions may be occupied by the content access application 101a, the user interface module 101b and/or the content access and registration part 101c, respectively. Another group of the storage portions may include the main content (e.g., movie), while another may have features that enhance the user's experience while accessing the content (e.g., subtitles, language options, bonus content, trailers, etc.). The media player 402 may be an electronic appliance or software embodied on or in a computer-readable medium which is executable by a computer to reproduce content from a storage medium. In other words, the media player 402 allows the content on the portable recording medium 401 to be reproduced or accessed. The media player 402 may contain one or more optical disc drives to accept portable recording mediums in an optical disc format or may have one or more USB ports instead for connecting portable recording mediums in a USB storage device format (e.g., USB Flash). In addition, the media player 402 may also have audio/visual ports (HDMI, VGA, component RGB, component YPbPr, etc.) for connecting cables between itself and the display 403 for communication. Further, the media player 402, may also be designed to be able to read a variety of formats (mkv, wmv, mp3, mpg4, etc.).

The media player 402 may be any of a variety of devices, such as a DVD player, a Blu-ray player, a game console, etc. Although the aforementioned devices (e.g., DVD player) may be solely dedicated to reproducing the content with the aid of a display, this may not always be the case. The media player 402 and the display 403 may not necessarily be two distinctive devices. For example, the media player 402 and the display 403 may be combined on a single device such as a smartphone or a tablet computer. In addition, although the portable recording medium 401 is shown connecting to the media player 402 as a separate object (e.g., a USB flash drive), it should be noted the portable recording medium 401 may be an optical disc inserted into the optical disc drive of the media player 402.

The media player 402 may also help in facilitating the registering, of media to a digital locker linked to a user's account. For example, after the user has either inserted the portable recording medium 401 in, or connected the portable recording medium 401 to, the media player 402, the user interface module 401b may cause the media player 402 to prompt, via the display 403, the user to enter validation information in order to associate that media with the user's account. Afterwards, the content access and registration part 401c may cause the media player to access a URL link or an application supported by BD-J code within the portable recording medium 401. Subsequently, the URL or application may lead to a validation authority which determines whether or not the validation information entered by the user previously is valid. In a case that the validation information is correct, the validation authority allows the content on the portable recording medium 401 to be registered with the user's account on a digital locker, thereby allowing the user to access it from any terminal he or she owns.

The display 403 converts digital content into visual, aural and/or other humanly perceptible and comprehensible stimuli. Examples of such an apparatus include monitors, televisions, displays, speakers, A/V receivers, mobile electronic devices, computers, etc. The display 403 may also contain audiovisual ports (HDMI, VGA, component RGB, component YPbPr, etc.) to connect to the media player 402. Further, the media player 402 and the display 403 may not necessarily be two distinctive devices. For example, the media player 402 and the display 403 may be combined on a single device such as smartphone or a tablet computer.

The server 404 may be one or more servers to provide service to the user's account. The server 404 may perform a variety of tasks to facilitate the registering of media to the user's account. For example, the server 404 may act as a validation authority to validate information entered by the user for accessing specific content on the portable recording medium 401. In a case that the validation information is correct, the server 404 may also perform the task of registering the specific content to a digital locker on the user's account. Further, the server 404 may also store content obtained from the portable recording medium 401 to the user's account.

In addition, the server 404 may store a plurality of specific contents before the retail distribution of portable storage medium 401. Further, the server 404 may store many versions of the same content. For example, the server may store a plurality of movies. Each movie may contain ten to twenty different versions (standard definition, high definition, ultra-high definition, director's cut, theatrical version, Windows, Android, iPad, etc.). As a result, after the user has registered the specific content to his or her digital locker, the user may not only access the specific content on the server 404 anytime but also any versions of it.

The terminal apparatus 405 can be any computing device, including but not limited to a tablet computer, a notebook computer, a personal or workstation computer, a kiosk, a PDA (personal digital assistant), a smartphone or handset, another information terminal, etc., that can communicate with other devices through the network 406. In addition, the terminal may allow the user to access any content previously registered with the digital locker associated with the user's account. The terminal apparatus 406 is further described infra with reference to FIG. 6.

The network 406 can be a local area network, a wide area network or any type of network such as an intranet, an extranet, a private or public cloud network, the Internet, etc., or a combination thereof. Further, other communications links (such as a virtual private network, a wireless link, etc.) may be used as well for the network 406. In addition, the network 406 preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well-known in the art and is discussed for example, in "How Networks Work", by Frank J. Derfler Jr. and Les Freed (Que Corporation 2000) and "How Computers Work", by Ron White, (Que Corporation 1999), the entire contents of each of which are incorporated herein by reference.

Figure 5:
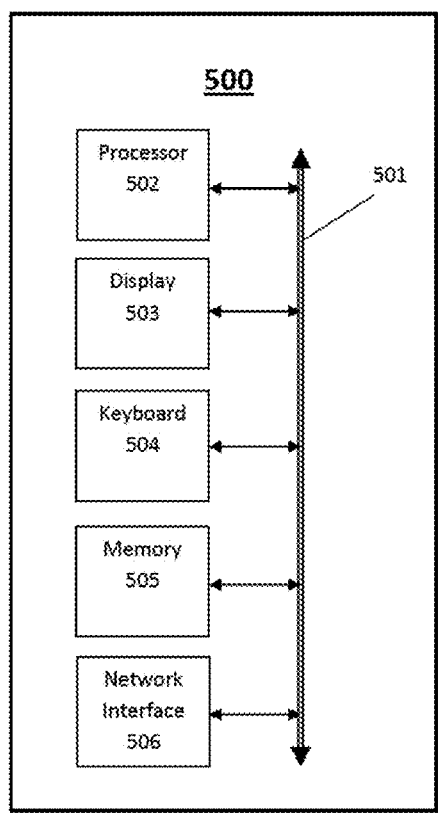
FIG. 5 shows a block diagram corresponding to an exemplary configuration of a computing device which can be configured to operate as a server or another service providing device.

FIG. 5 shows an exemplary constitution of a computer 500 that can be configured (for example, through software) to operate (at least in part) as the server 404 of FIG. 4. The computer 500 includes a processor (or central processing unit) 502 that communicates with a number of other components, including display 503, keyboard 504, a memory or storage part 505 and network interface 506, by way of a system bus 501. The computing device 500 may be a special purpose device (such as including one or more application specific integrated circuits or an appropriate combination of conventional component circuits) or it may be software configured on a conventional personal computer or computer workstation with sufficient memory, processing and communication capabilities to operate as a terminal and/or server, as will be appreciated to those skilled in the relevant arts.

Additional aspects or components of the computing device 500 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler. Jr. and Les Freed (Que Corporation 2000), the entire contents of each of which are incorporated herein by reference.

Figure 6:
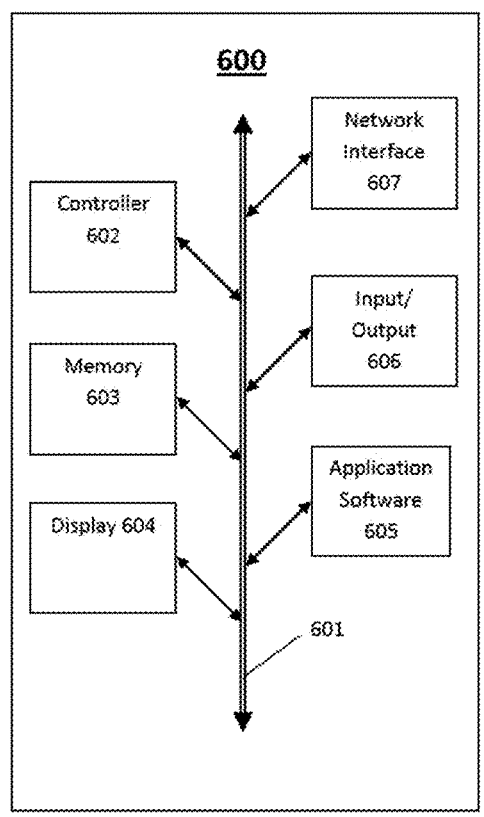
FIG. 6 shows a block diagram of an exemplary configuration of a terminal apparatus.

FIG. 6 shows an exemplary constitution of the terminal apparatus 405 of FIG. 4 (for example, as a computer). In FIG. 6, a computer 600 includes a controller (or central processing unit) 602 that communicates with a number of other components, including memory 603, display 604, application software 605, input/output (such as mouse, keyboard, touchpad, stylus, microphone and/or speaker with voice/speech interface and/or recognition software, etc.) 606 and network interface 607, by way of an internal bus 601.

The memory 603 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 607 provides a connection (for example, by way of an Ethernet connection or other network connection which supports any desired network protocol such as, but not limited to TCP/IP, IPX, IPX/SPX, or NetBEUI) to the network to which the computer 600 is connected (e.g., network 406 of FIG. 4). The application software 605 is shown as a component connected to the internal bus 601, but in practice is typically stored in storage media such as a hard disk or portable media, and/or received through the network, and loaded into memory 603 as the need arises.

Additional aspects or components of the computer 600 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Figure 7:
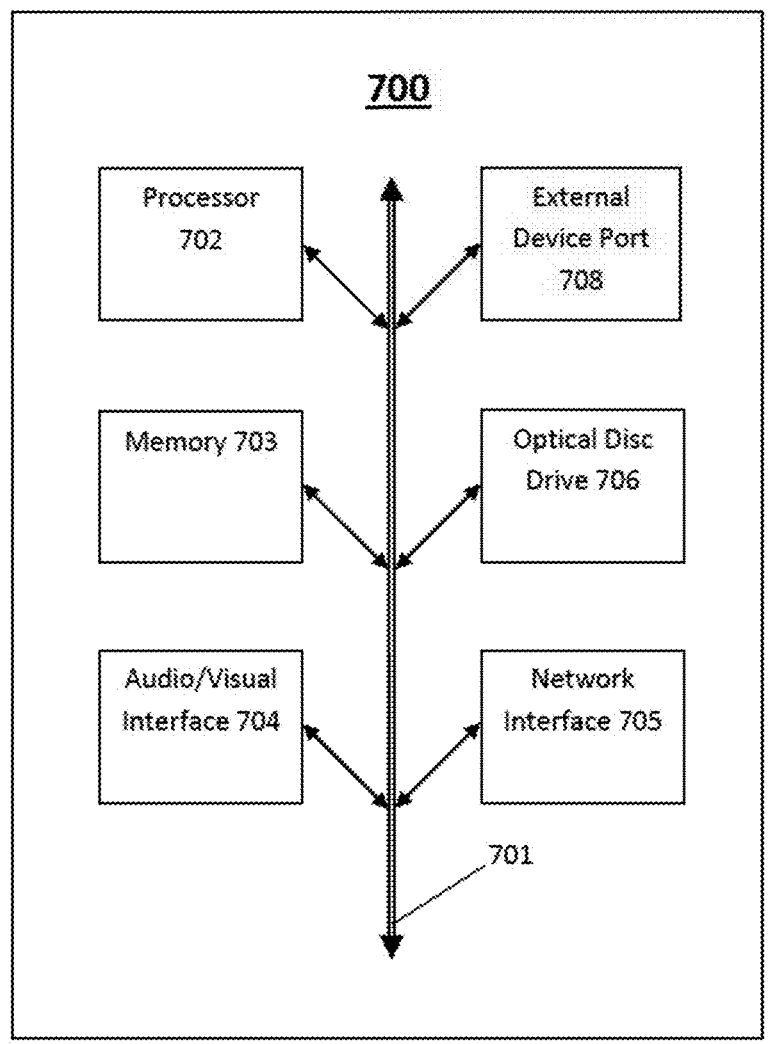
FIG. 7 shows a block diagram of an exemplary configuration of a media player.

An example of a configuration of a media player (e.g. media player 402) is shown schematically in FIG. 7. In FIG. 7, a media player 700 includes a controller (or central processing unit) 702 that communicates with a number of other components, including memory 703, display 704, application software 705, input/output (such as mouse, keyboard, touchpad, stylus, microphone and/or speaker with voice/speech interface and/or recognition software, etc.) 706 and network interface 707, by way of an internal bus 701.

The memory 703 can provide storage for program and data, and may include a combination of assorted conventional storage devices such as buffers, registers and memories [for example, read-only memory (ROM), programmable ROM (PROM), erasable PROM (EPROM) electrically erasable PROM (EEPROM), static random access memory (SRAM), dynamic random access memory (DRAM), non-volatile random access memory (NOVRAM), etc.].

The audio/visual interface 704 allows the media player 700 to be connected to a display device, thereby allowing digital data from a portable recording medium to be presented in a visual format. The audiovisual interface 704 may come in a variety of formats such as HDMI, VGA, component RGB, component YPbPr, etc.

The network interface 705 may be a wired or wireless data communication part, configured to transmit and/or receive data (which may include audio or other information) to and/or from a remote server or other electronic device. Such wired or wireless data communication part may the same as or different from any wired or wireless audio output part. As an example, a wireless data communication part may be configured to communicate data according to one or more data communication protocols, such as GSM (Global System for Mobile Communications), GPRS (General Packet Radio Service), CDMA (Code Division Multiple Access), EV-DO (Evolution-Data Optimized), EDGE (Enhanced Data Rates for GSM Evolution), 3GSM, HSPA (High Speed Packet Access), HSPA+, LTE (Long Term Evolution), LGE Advanced, DECT, WiFi™, Bluetooth™, etc.

The external device port 706 may provide a connection between the media player 700 and an external storage device USB flash drive, external/internal hard disc drive, etc.).

The optical disc drive 708 allows the media player 700 to accept optical discs (DVD, Blu-ray, CD, etc.) in order to reproduce content from said optical discs. The optical disc drive 708 may comprise a compartment or tray to hold an optical disc while a laser reads the information off the disc to reproduce the content.

Additional aspects or components of the media player 700 are conventional (unless otherwise discussed herein), and in the interest of clarity and brevity are not discussed in detail herein.

A process performed by a media player (e.g., 101), according to an exemplary embodiment, will now be discussed with reference to FIG. 8 and FIGS. 9A-9P.

Figure 9A:
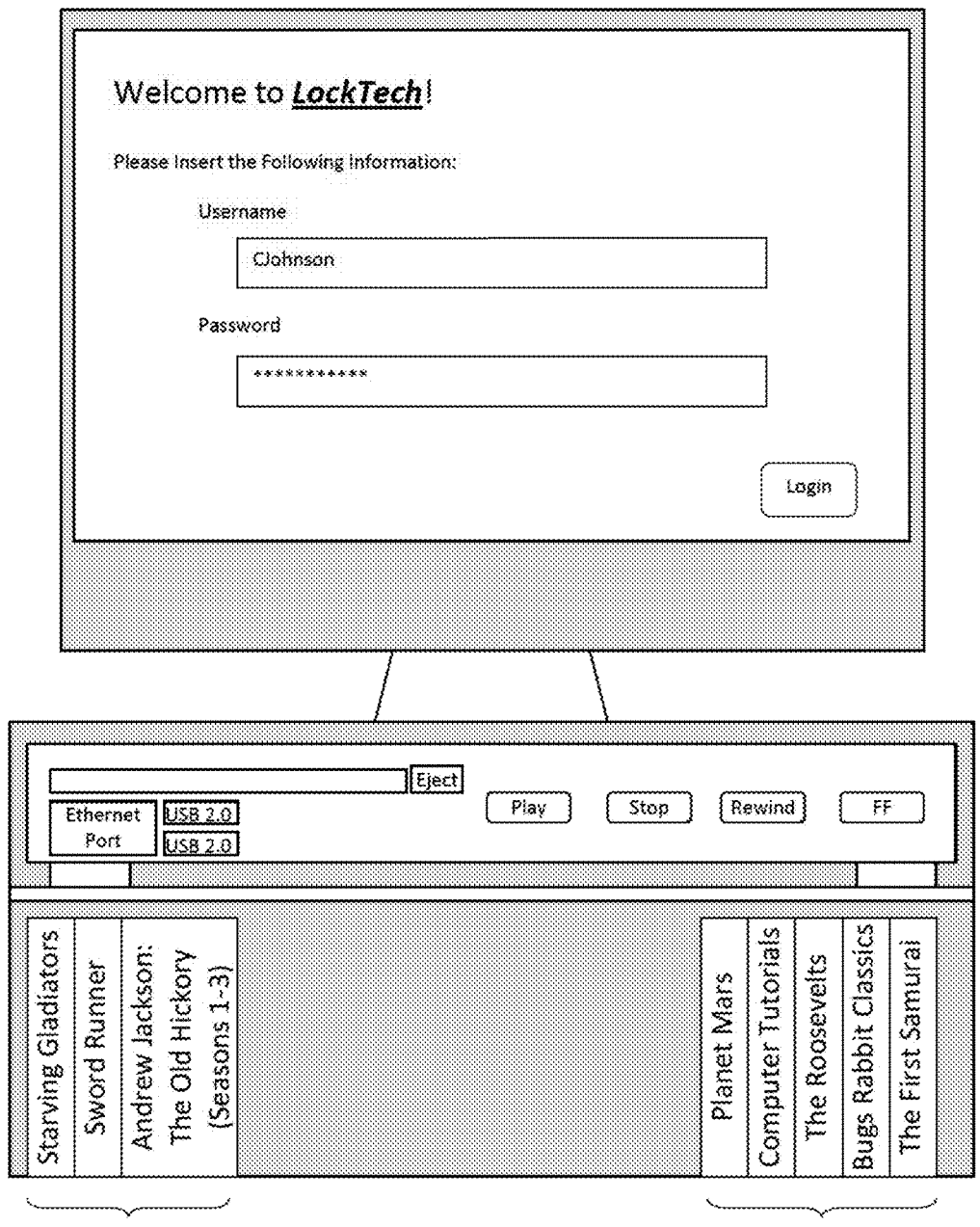
FIGS. 9A-9P show examples of user interface display screens displayed on an display connected to the media player, according to an exemplary embodiment.

FIG. 9A illustrates a display (e.g., television, monitor, screen, etc.) connected to a media player (e.g., DVD/BD/CD player, smartphone, computer, laptop, tablet computer, etc.) which is connected to a network (e.g., Internet) via an Ethernet port or a wireless card. As shown the media player includes a places to insert a portable storage medium (e.g., CD, DVD, BD, USB flash drive, portable hard disc drive, etc.) such as the USB 2.0/3.0 ports and the disc drive adjacent to the "eject" button. Further below the media player are several boxes containing different types of content (movies, documentaries, cartoons, tutorials, etc.) that are stored on a portable storage medium. It should be noted that in this case, the boxes are separated into two sets by the user. The first box set 600 groups media ("Starving", "Gladiators", "Sword Runner", "Andrew Jackson") that the user has recently bought and has not yet been played on the media player, while the second box set 601 groups media ("Planet Mars", "Computer Tutorials", "The Roosevelts", "Bugs Rabbit Classics", "The First Samurai") that the user has already played on the media player. It should be noted that each media in each of the first box set 600 and the second box set 601 may come in any type of portable storage medium such as a DVD, Blu-ray Disc, CD, etc. and that each media is in a format (e.g., MP3, MP4, mkv, wmv, etc.) that is playable by the media player.

Figure 9B:
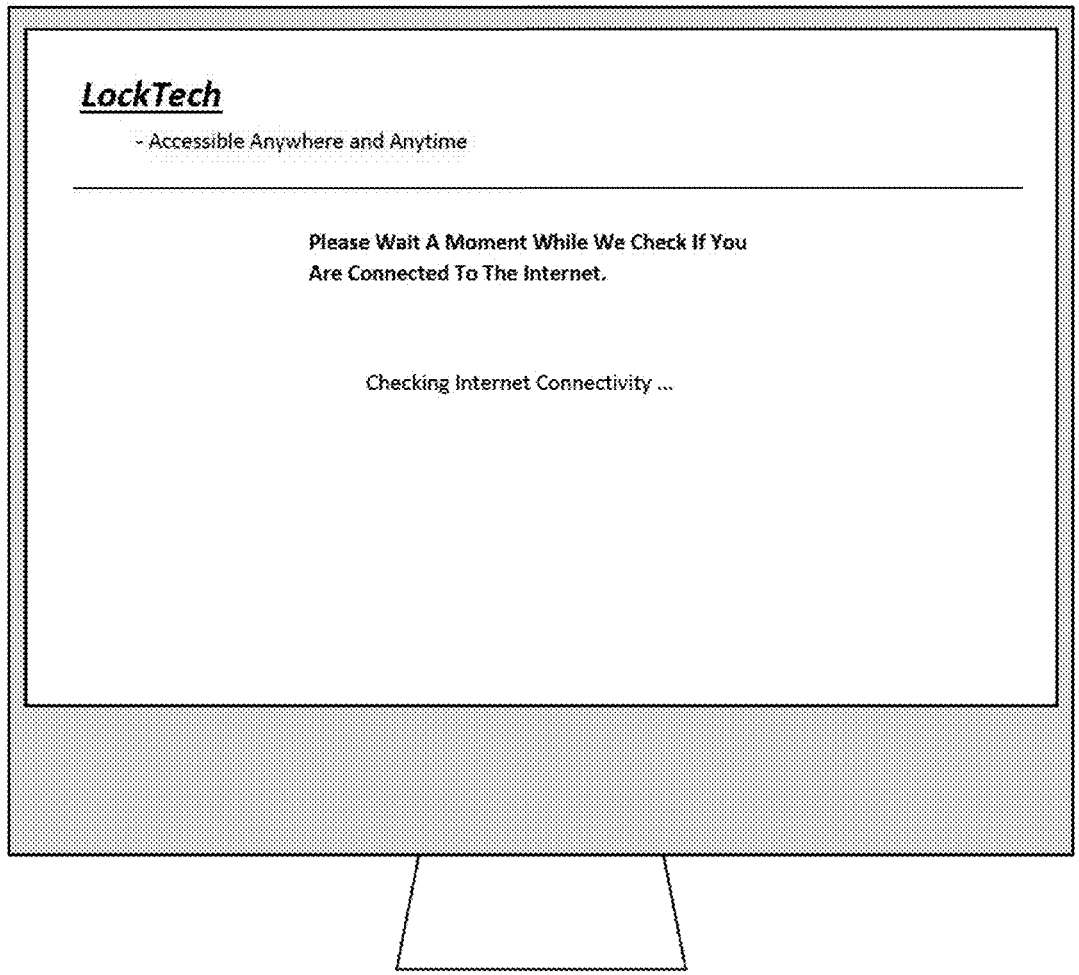
Figure 9C:
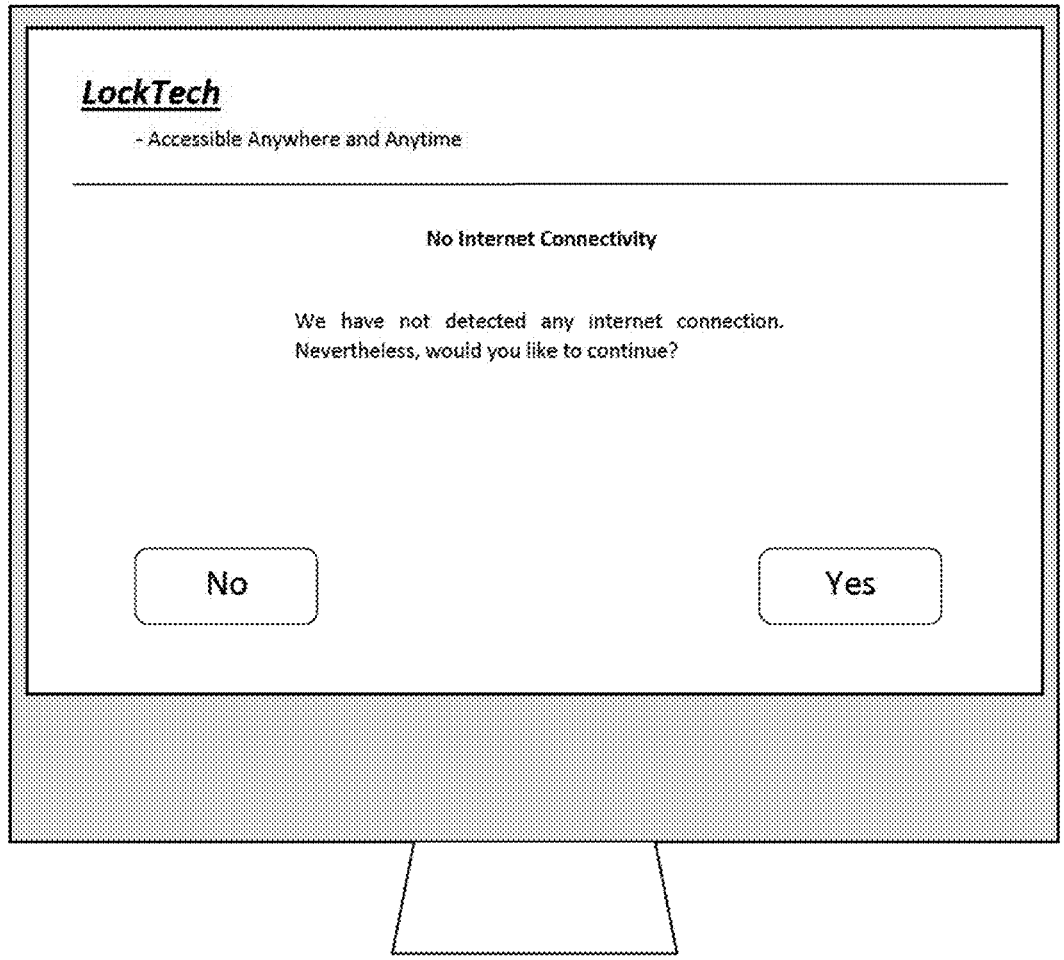
Figure 9D:
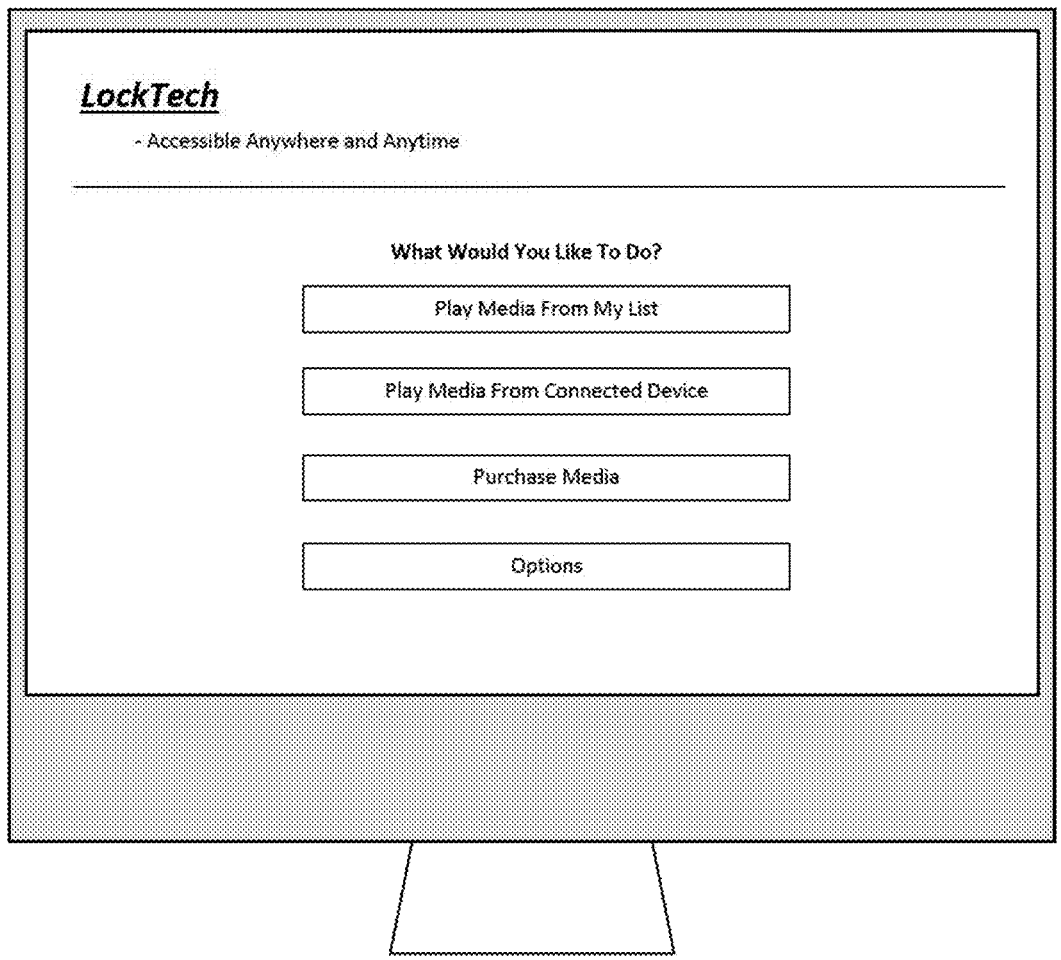
Figure 9E:
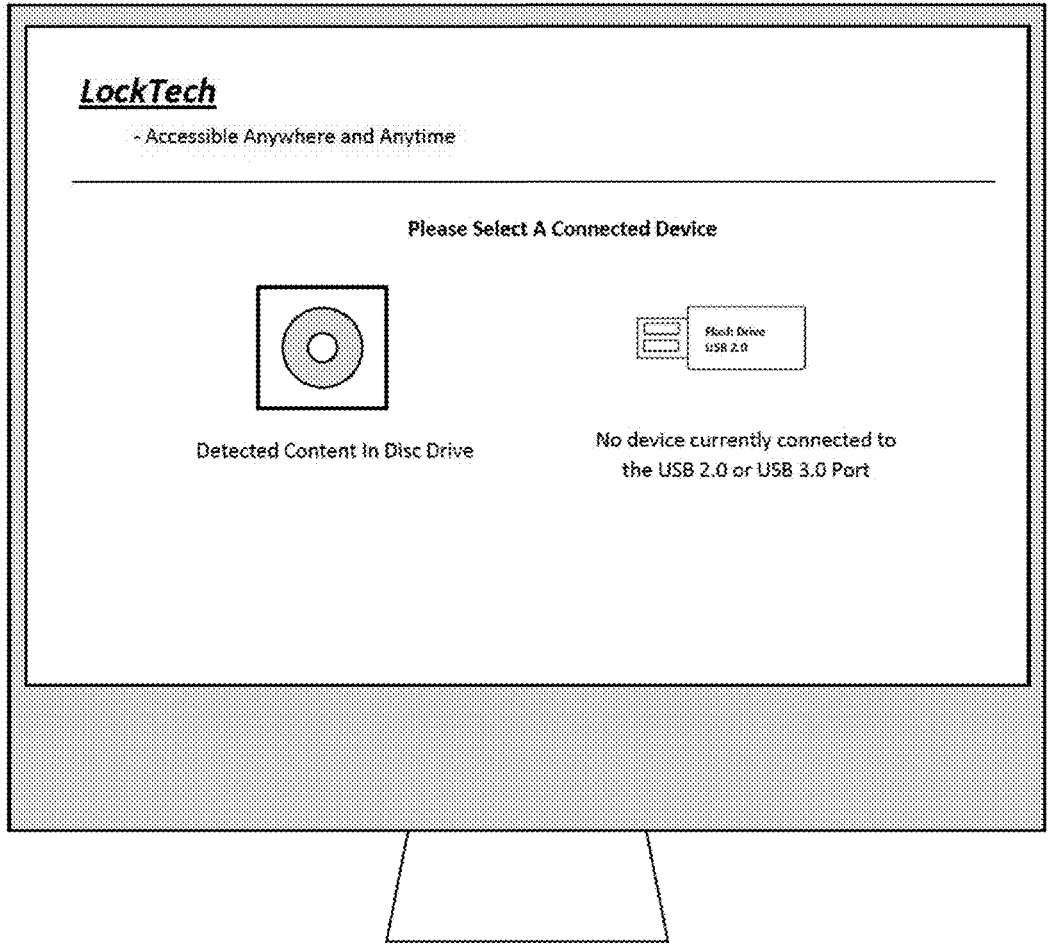

When a user wants to access any media, from the first box set 600, on the media player, the user firsts inputs user credentials (e.g., username and password) onto the media player in order to login and access his or her personal account. After the user has logged in, the media player checks whether it is connected to the Internet (i.e. by Ethernet or wireless card), as shown in FIG. 9B. In a case that the media player is not connected, the user is informed of this and is given the opportunity to continue regardless of whether there is an Internet connection, as shown in FIG. 9C. Next, the media player outputs options, via the display, for the user to select from as illustrated in FIG. 9D. As shown, the user may perform a variety of tasks. For example, the user may access content that has been played on the media player previously and is stored on the user's account. On the other hand, the user may access content from a portable storage medium that is inserted into or connected to the media player. In this case, the user selects to access content from a portable storage medium (S801) and inserts the Blu-ray disc movie "Starving Gladiators" into the media player. Then, the media player presents the user with a screen such as shown in FIG. 9E. In this case, the media player attempts to detect any portable storage medium that has either been connected to or inserted into the media player (S802). Since the user has only inserted the Blu-ray disc movie "Starving Gladiators" and has not connected any electronic device to the USB 2.0/3.0 ports, the media player informs the user that there it has not detected any devices connected to the USB 2.0/3.0 ports but that there is a portable storage medium in the disc drive. Afterwards, the user confirms the selection made and the media player starts running the Blu-ray disc movie "Starving Gladiators".

Figure 9F:
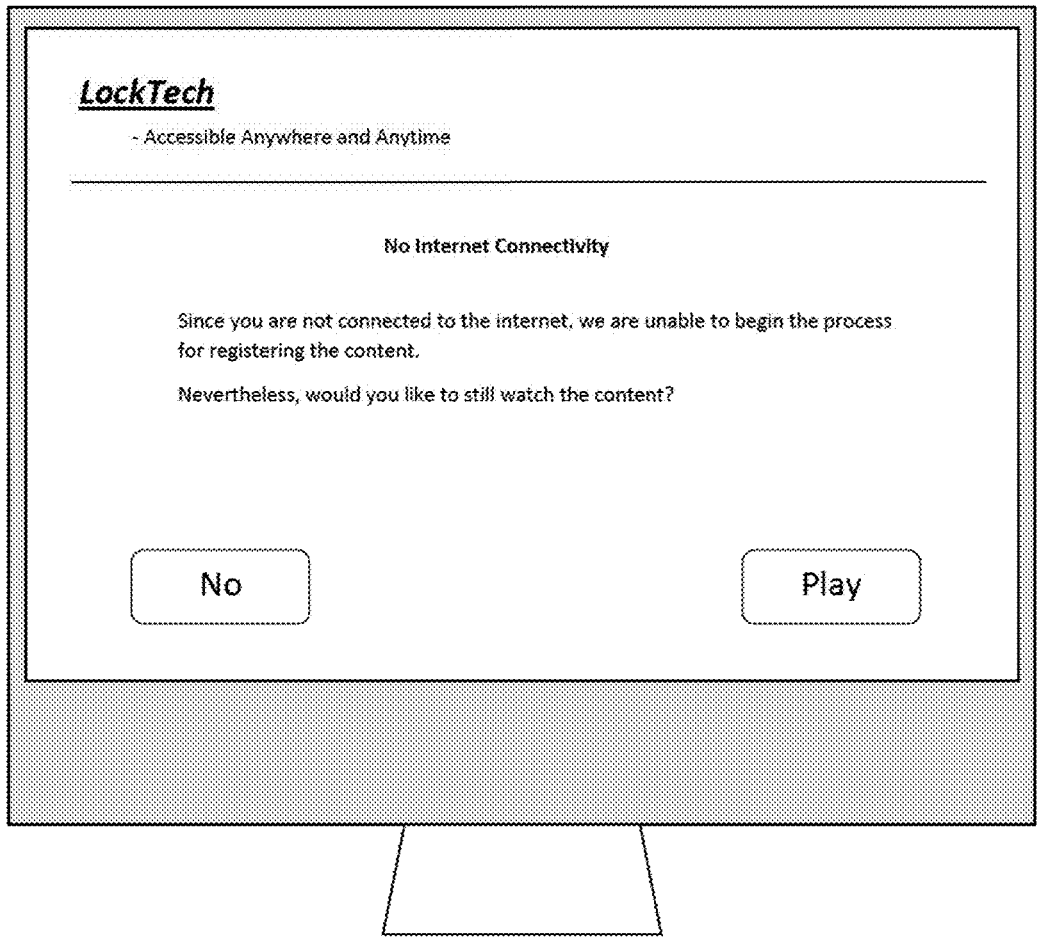
Figure 9G:
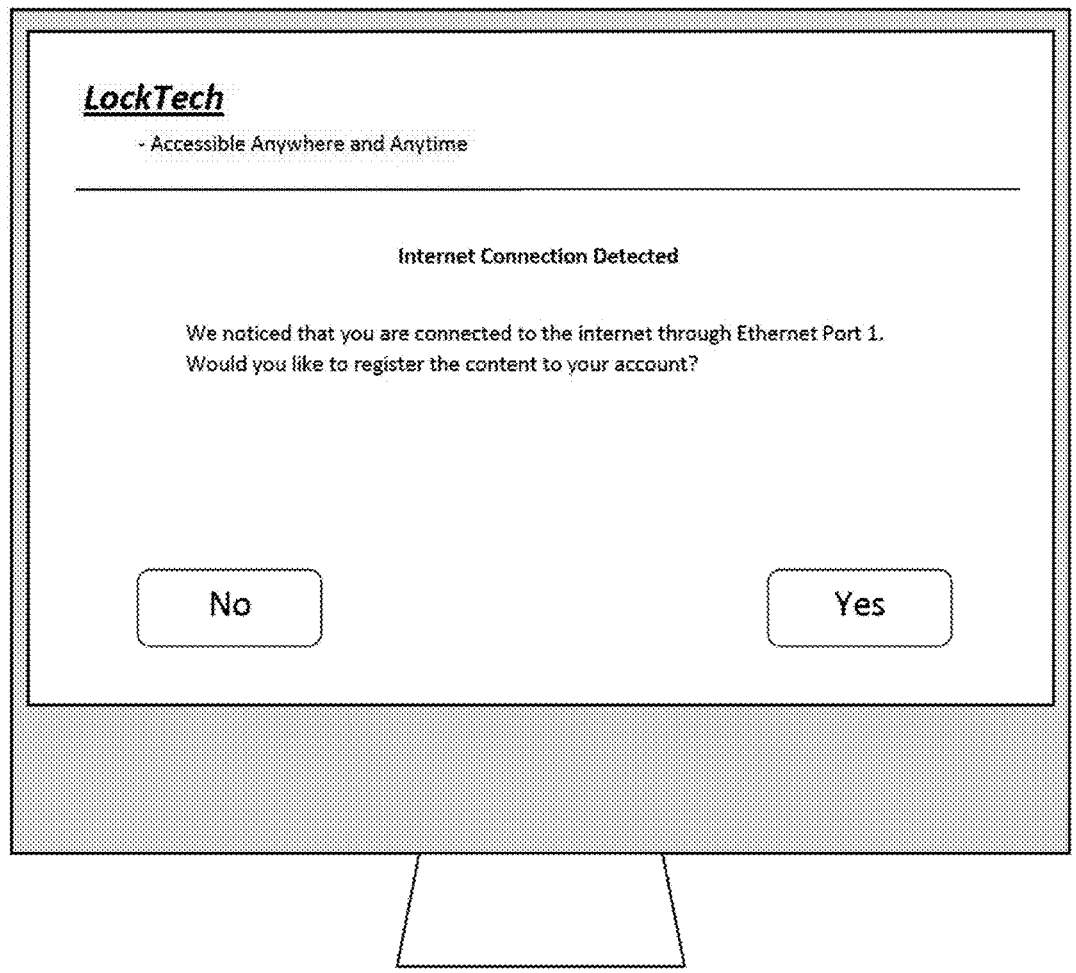

Next, after starting to run the movie, the media player outputs, for a second time, a message to the user indicating the status of the Internet connection. In a case that the media player is not connected to the Internet, the user is informed of this and is given the option of accessing the content on the Blu-ray disc as shown in FIG. 9F. Thus, it is not necessary for the user to be connected to the Internet or to register the content in order to access it. In other words, the content is always available to the user. In a case that the user is connected to the Internet, he or she may be given the option of not registering the movie to his or her account as shown in FIG. 9G. As state previously, since the user can watch the movie without registering it to his or her account, the user may simply select not to register because he or she might be impatient and want to watch the content right away.

It should be noted that, in addition to the main content (e.g., a movie entitled "Starving Gladiators"), the Blu-ray disc may also contain files that may enhance the user's experience (e.g., subtitles, language options, bonus content, extra "mini-movie" trailers, etc.) or may help facilitate registering the movie to the user's account. In the latter case, this may be performed by including a URL or an application supported by BD-J code which is located on a file inside the disc during the authoring process. As a result, when the media player starts running the Blu-ray disc movie "Starving Gladiators" after the user has selected to register the movie to his or her account, the Blu-ray disc initiates the first action that the media player takes, after running the inserted Blu-ray disc, is to access a website via a URL (http://www.locktech.com/myaccount/media/activation). The website may be located on a server or a group of servers belonging to a company or a consortium of companies that provides service for the user's account. The server or group of servers may perform tasks such as storing data related the user's account, register media for the user, storing media, etc. In a case that the content is on a USB flash drive, a program on the flash drive may facilitate the registration instead.

Figure 9H:
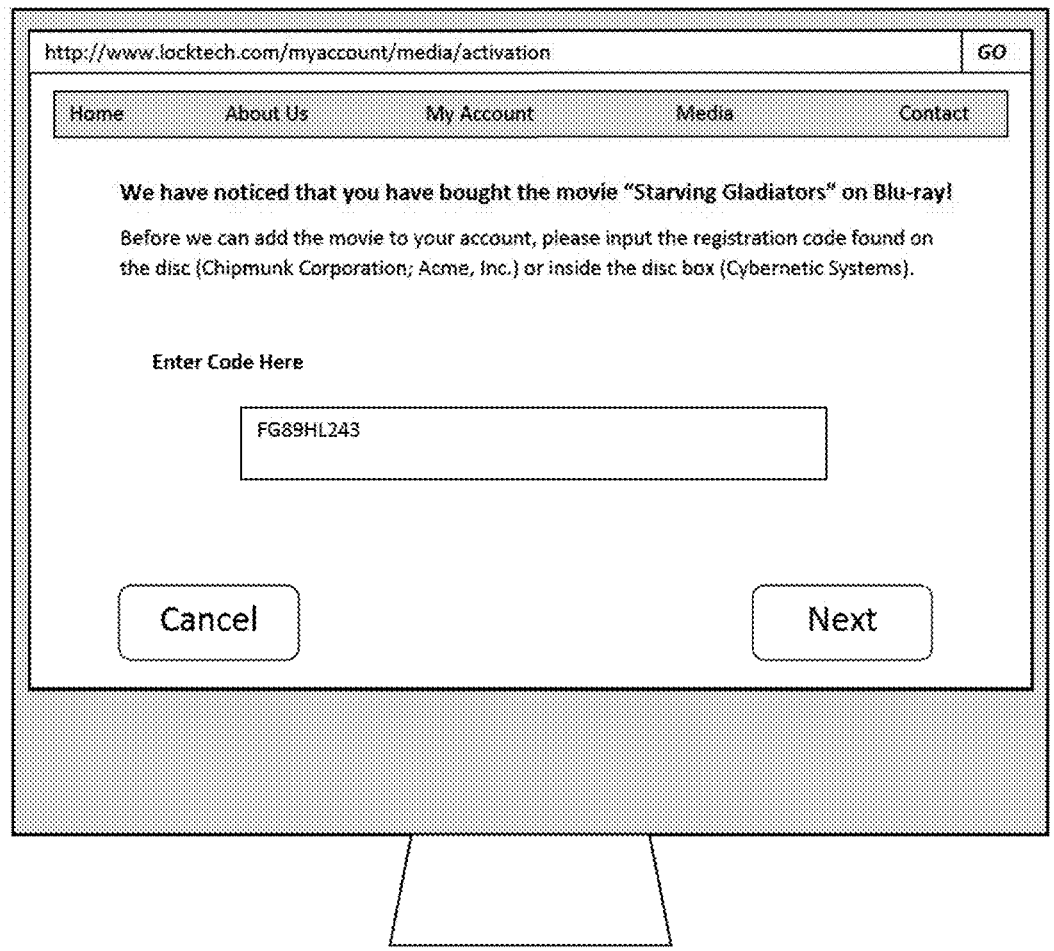

Next, after the website has been accessed, a browser displaying the contents of the site is displayed to the user via the BD-J code or a program on the USB flash drive as shown in FIG. 9H. The website, via the media player, then prompts the user to enter a registration code (S803) whose purpose is to register that particular copy of the Blu-ray disc movie "Starving Gladiators" to the user's account. It should be noted that the registration code may be found at different places. For example, this may depend on the retailer that the user has bought the movie from. In one case the user is told that if the disc was bought from a certain retail store "Chipmunk Corporation; Acme, Inc."), the registration code may appear as a series of alphanumeric characters written externally on the disc containing the movie "Starving Gladiators". On the other hand, if the disc was bought from another retail store (i.e. "Cybernetic Systems"), the registration may instead be found inside the box containing the movie "Starving Gladiators".

In addition, the registration code is unique to every copy of the movie "Starving Gladiators". For example, the registration code found on the user's copy may be "FG89HL243". However, another copy may have the registration code "76YHC92I9" instead, even though both copies contain the exact same content. The existence of multiple registration codes may be to prevent the same copy of a movie from being registered to different accounts. After the user has entered the registration code, the media player determines whether the registration code is valid (S804). It may possible that only a limited amount of registration codes were produced or the registration codes may be created in such a way that each character in the registration code corresponds to the properties of the content (e.g., production line number, date manufactured, country/region of origin, etc.). Consequently, this may prevent untrustworthy users from arbitrarily guessing the registration code.

Figure 9I:
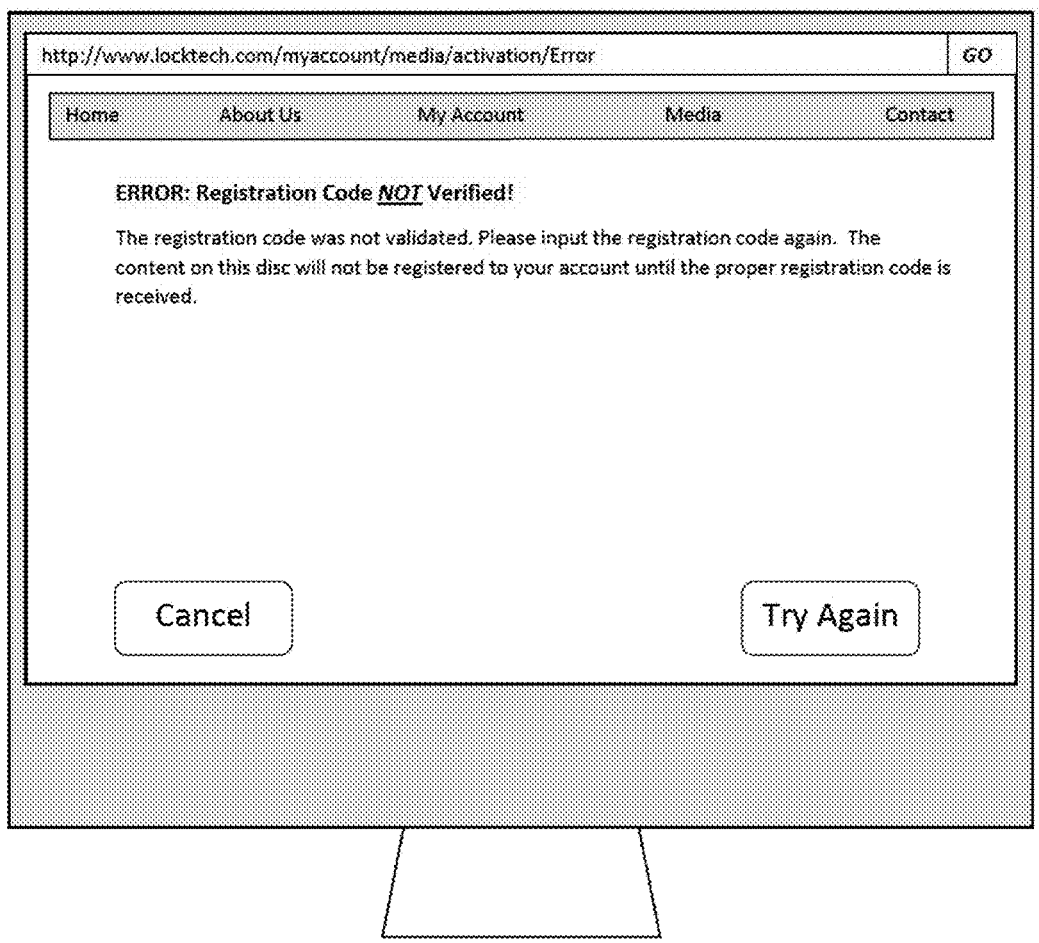
Figure 9J:
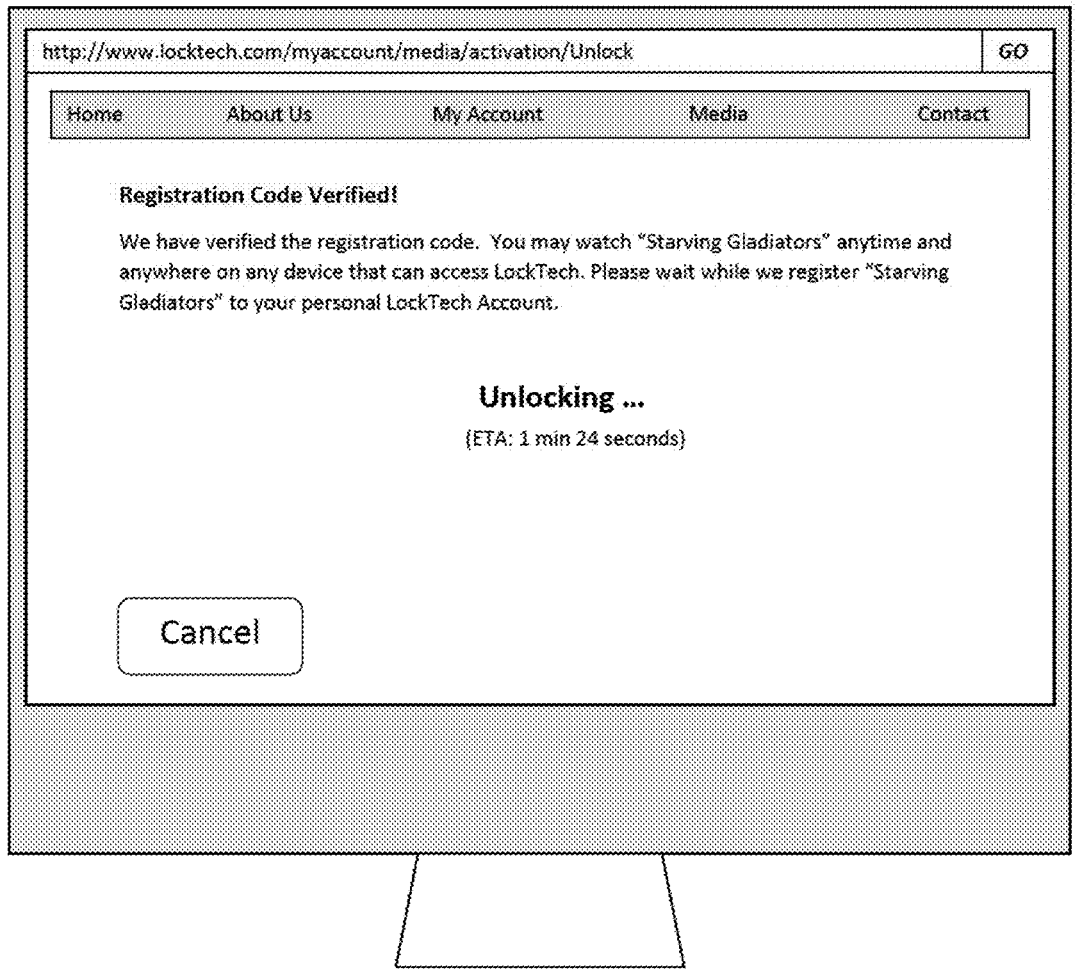
Figure 9K:
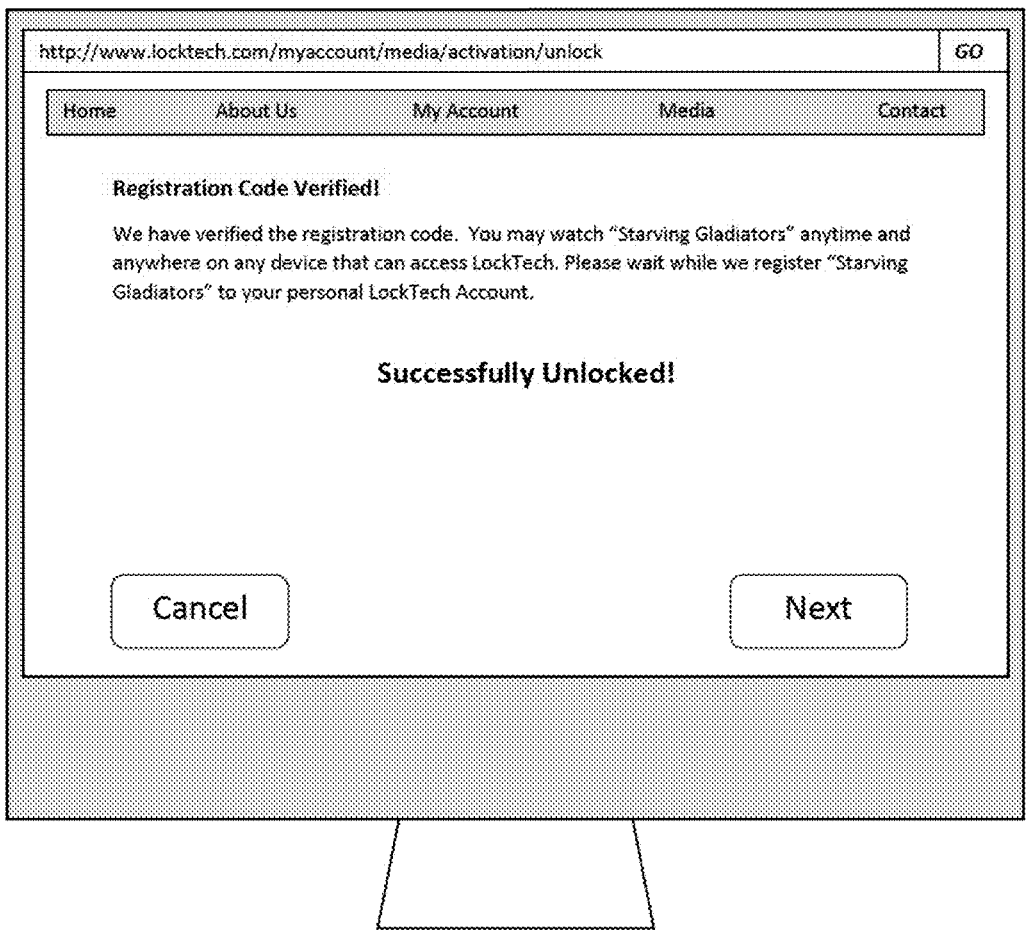

In a case that the registration code is not valid (S804, No), an error message is outputted to the user (S807) as shown in FIG. 9I. Consequently, the user is unable to register the movie with his or her account as the information that he or she inputted was not validated. On the other hand, in a case that the registration code is valid (S804, Yes), the media player outputs a message to the user explaining that the registration code has been verified and is currently in the process of registering it to the user's account (S805) as shown in FIG. 9J. After the movie has been successfully linked to the user's account, shown in FIG. 9K, the user may select to play it (step S806). It should be noted that since a copy of the movie already exists on the server or groups of servers, the user merely unlocks the content on the server or groups of servers. By unlocking the content, the user may watch the movie on any device (PC, tablet computer, smartphone, etc.) the user possesses that is able to access the user's account. Consequently, the user can play the Blu-ray disc movie "Starving Gladiators" without requiring the physical copy of the movie to be present or inputting the registration code again.

Figure 9L:
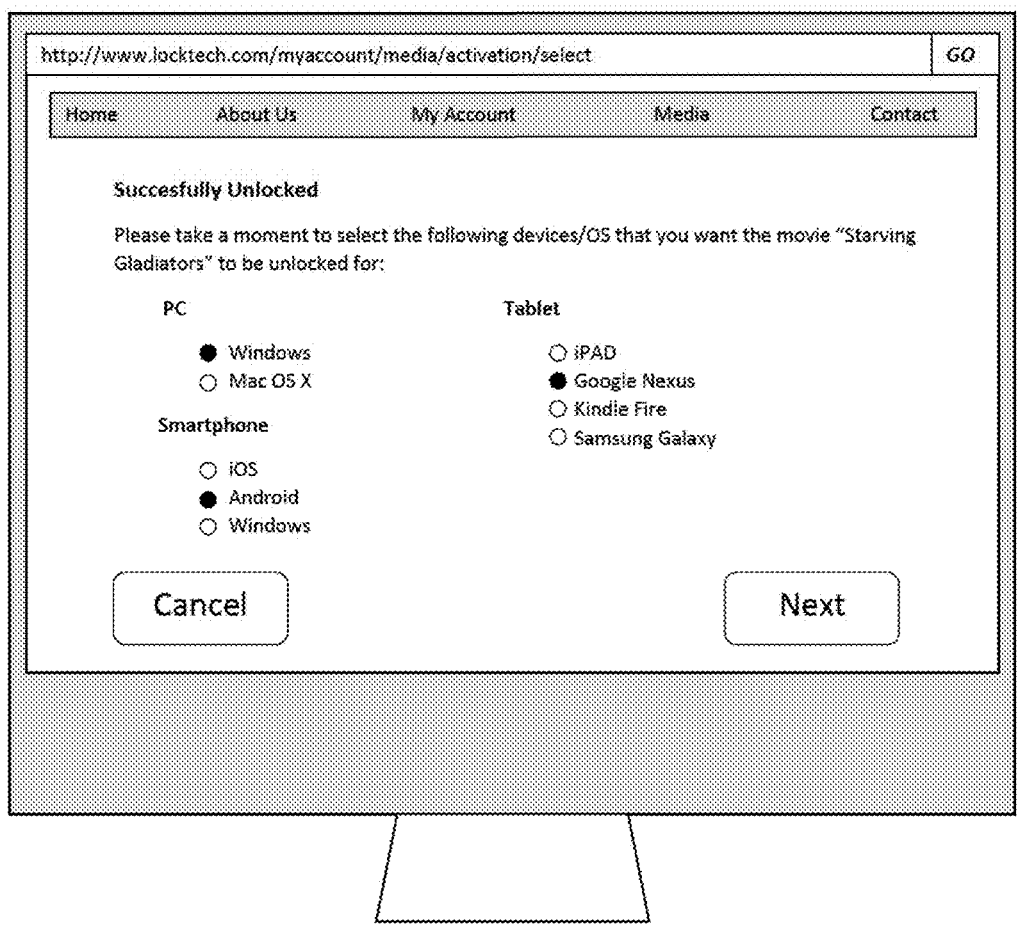

In an exemplary embodiment, after the registration code has been verified, the user may be prompted to select certain devices and/or operating systems (OS) that the user wants the movie "Starving Gladiators" to be unlocked for as shown in FIG. 9L. For example, the user may possess a personal computer (PC) that runs Windows OS, a smartphone that runs Android OS and a Google Nexus tablet. Consequently, the user may find it convenient to unlock the movie "Starving Gladiators" for all of devices that h she possesses. As a result, by performing this task, it may be more convenient for the user in the future, when he or she desires to watch the movie "Starving Gladiators" on those devices.

Figure 9M:

In another exemplary embodiment, in case the estimated time for registering the movie to the user's account may be long (e.g., 1 hour) due to a variety of reasons slow Internet speed), the registration may be performed while the user is accessing the media as shown in FIG. 9M.

Figure 9N:
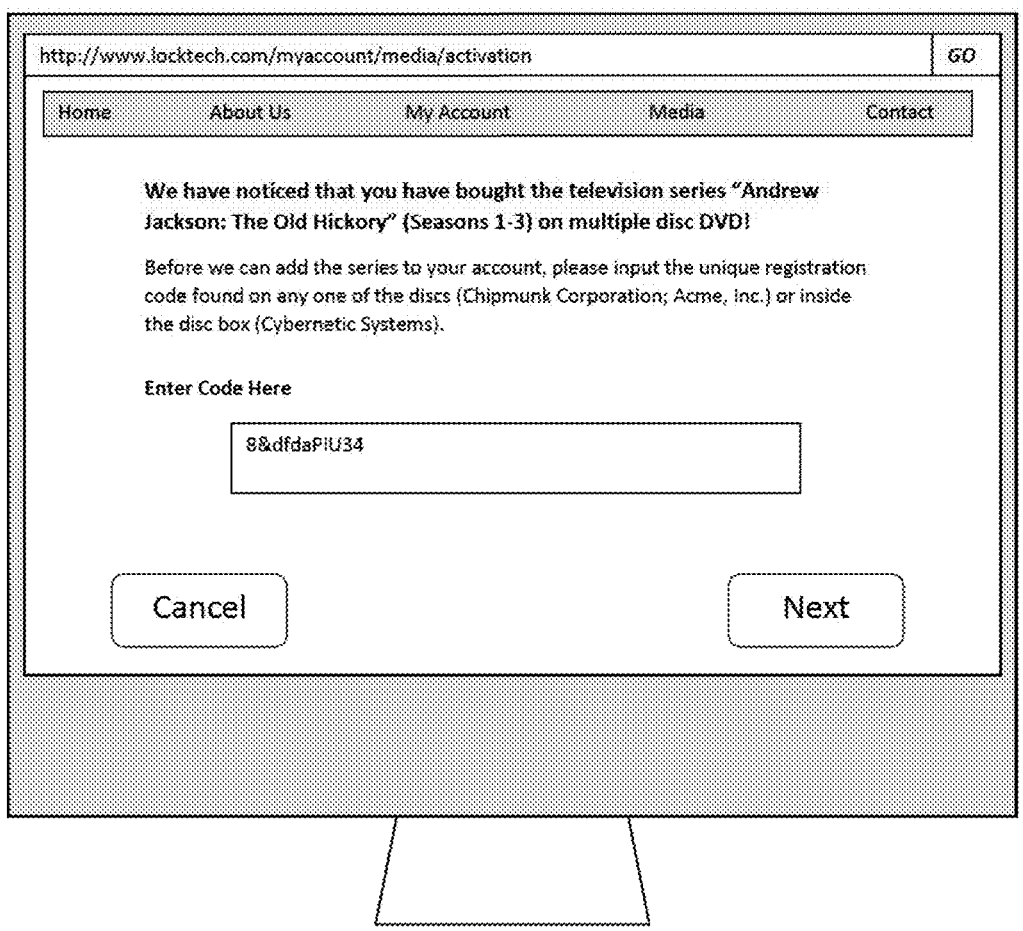

In another exemplary embodiment, the media may be on multiple discs. For example, after the user has registered the Blu-ray disc movie "Starving Gladiators", he or she may register the television series "Andrew Jackson: The Old Hickory" (Seasons 1-3) which is on DVD and comes in a box set, as shown in FIG. 9N. However, even though the television series "Andrew Jackson: The Old Hickory" is on multiple discs, it does not mean that the user is required to register every disc to his or her account. Instead, each disc within the set contains the same unique registration code. The user need insert only one of the discs to register the entire box set to his or her account. Consequently, this provides more convenience for the user. For example, there may be three discs in the set with each containing one season of the television series "Andrew Jackson: The Old Hickory". However, it may be possible that the user has already viewed season one of the television series at his or her friend's house. Thus, when the user bought the set, he or she may be only interested in viewing seasons two and three. When, the user inserts the disc for season two, the media player may requests the user for the registration code which, as stated previously, is the same on all the discs. Once, the registration code has been validated, the user can now access any of the three seasons from this or her account.

Figure 9O:
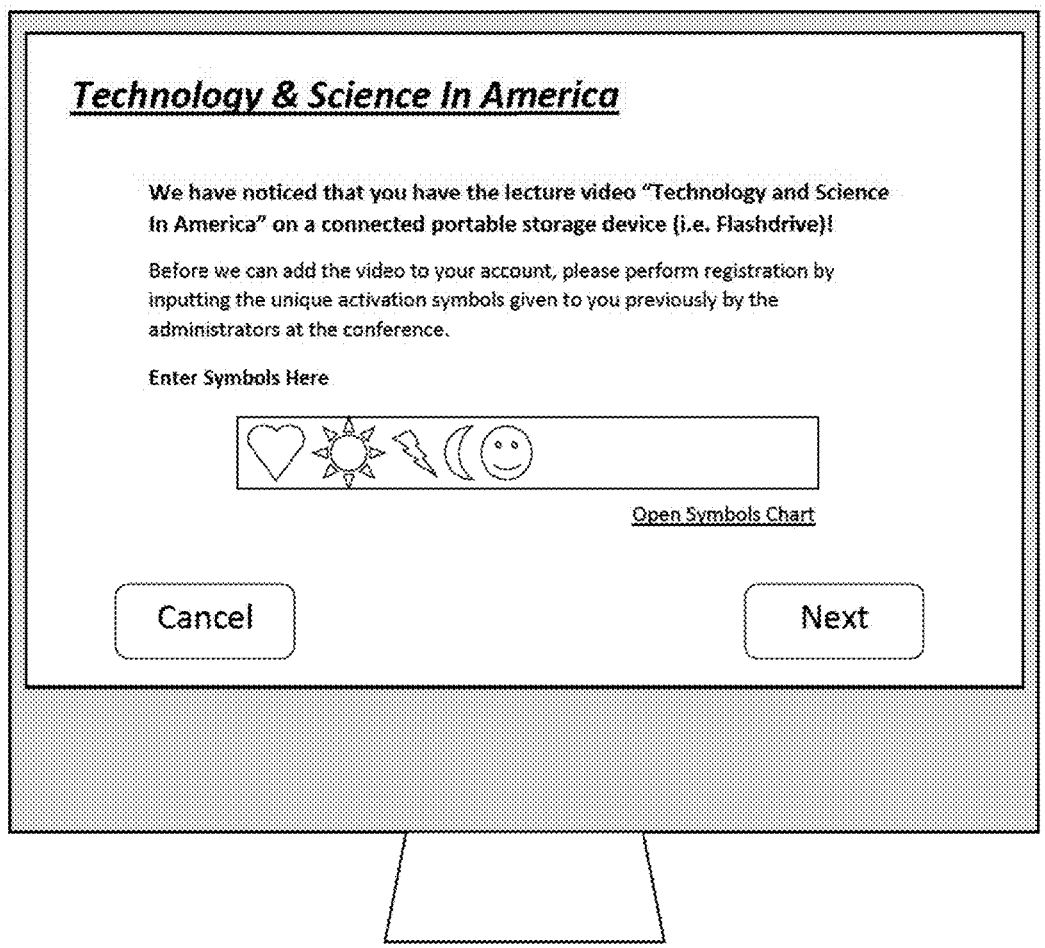

In another exemplary embodiment, the media may be on a portable storage device such as a flash drive or portable hard disc drive. For example, the user may have attended a technology conference that was exclusive to only a few people. After the conference was over, all attendees were given a recording of the conference on a portable storage device such as a flash drive. Further, each attendee was given by administrators of the conference, via e-mail, a set of unique activation symbols (stars, moon, hearts, lightning bolt, etc.). It should be noted that, like the registration code, each set of the unique activation symbols is unique to each attendee. When the user attaches his or her flash drive to the media player and the media player, a program on the flash drive activates and creates a user interface screen unique to that program (e.g., the program was created by the conference administrators and therefore its user interface screen may correspond to the conference) and requests the user to input the unique activation symbols, the user may check his or her e-mail to obtain them. In a case that the user received a Blu-ray disc, an application (such as BD-J code) providing a user interface may be presented to the user instead. Afterwards, the user may enter the unique activation symbols, as shown in FIG. 9O, and access the content on the flash drive. It should be noted that in this case, when the user has selected to obtain content from the flash drive, an application on the media player accepts the unique activation symbols and communicates it to the servers or group of servers for validation.

In another exemplary embodiment, the user may be required by the media player to input more than one piece of information. Further, the information may be more than just a series of alphanumeric characters. For example, in FIG. 9P, the user has bought recently a music video "American Goat Gregorian Orchestra" on a CD from a retail store which is a members-only chain. In other words, only members of the retail store may buy products from it. Further, any purchases made by the members is automatically recorded in the retail store's computer system. The user, in this case, is "Charles Johnson" who is a member a the retail store and whose member ID is "CJohnson986". Like previously, when "Charles" attempts to access the music video, the media player prompts him to enter several pieces of validation information. Such information includes his first and last name as well as his member ID number. Since, it has been recorded that "Charles" has purchased the music video, the information "Charles" has entered is matched with the records in the retail store. Consequently, "Charles" can now access the music video anytime he wants.

Figure 10:
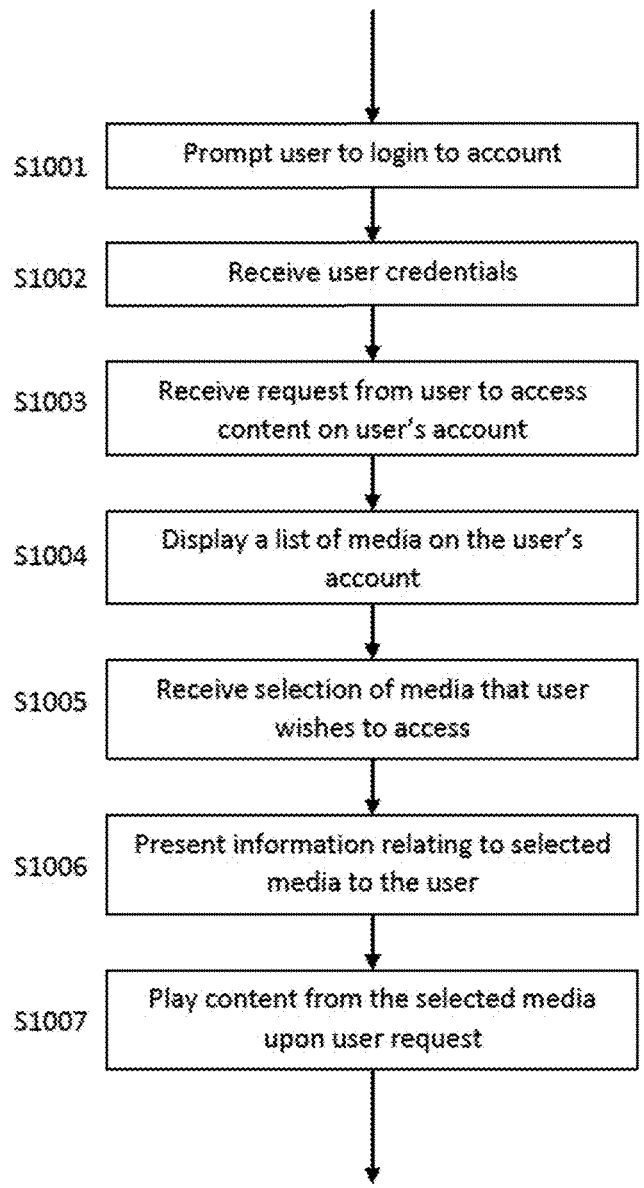
FIG. 10 shows a flow chart of a method performed by a terminal to access registered content on a digital locker, according to an exemplary embodiment.

FIG. 10 shows a process performed by a terminal (e.g., 105), for executing content on media, according to an exemplary embodiment.

After the user has registered at least one type of digital media to his or her account, he or she may access that particular media from any of the user's device. For example, after the user has registered the movie "Starving Gladiators" to his or her account, the user begins to watch the movie immediately on her forty-inch plasma television set. However, the user only watches half of the movie "Starving Gladiators", which runs for about three hours, before realizing he or she has to sleep in order to wake up early for a meeting in the capital. To get to the capital, the user boards a train which will arrive there in about two hours. Since, the user has nothing better to do on the train, he or she decides to finish watching the rest of the movie "Starving Gladiators" on his or her portable terminal (e.g., smartphone, tablet computer, laptop, game console, etc.).

Figure 11A:
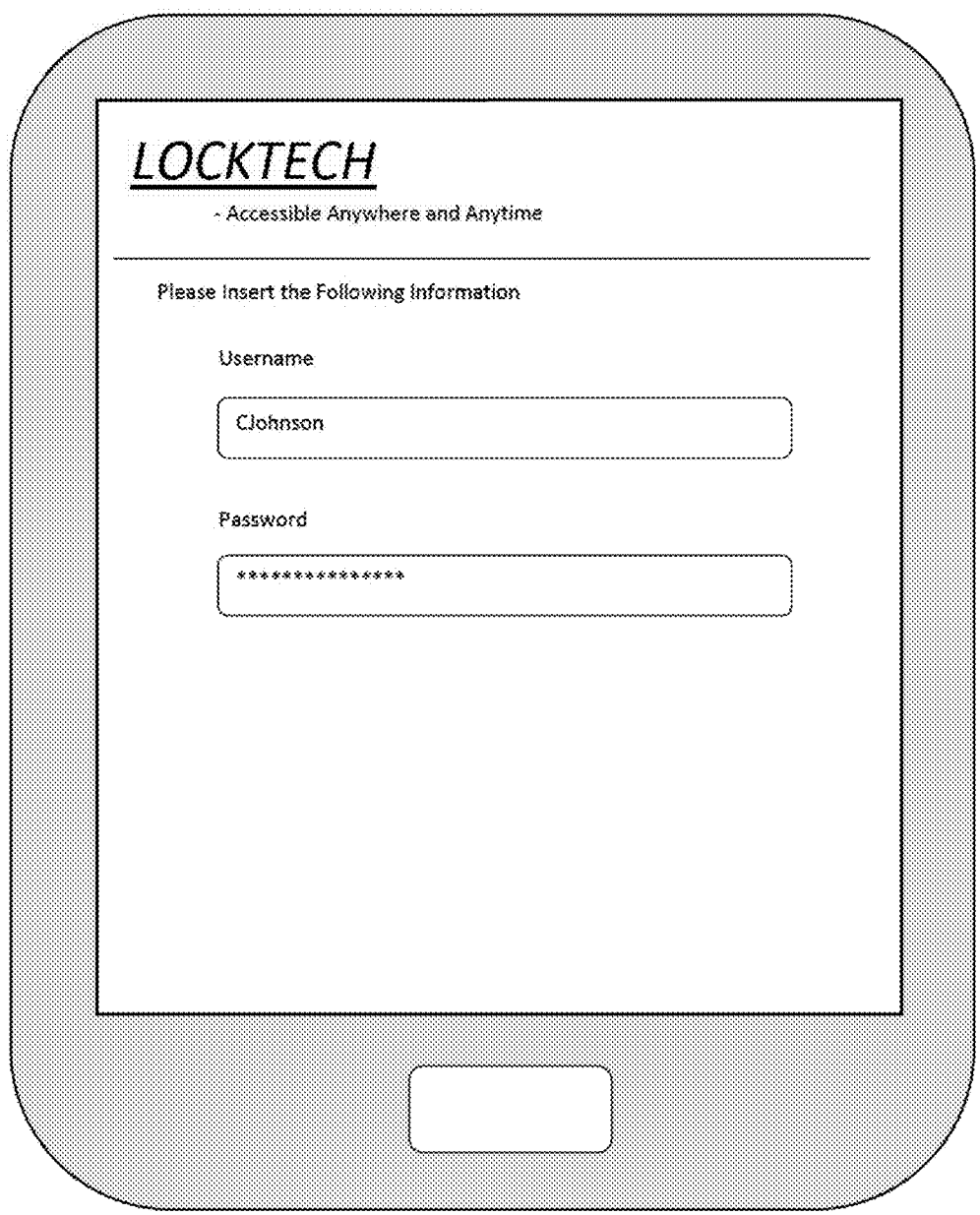
FIGS. 11A-11D show examples of user interface display screens displayed terminal apparatus, according to an exemplary embodiment.
Figure 11B:
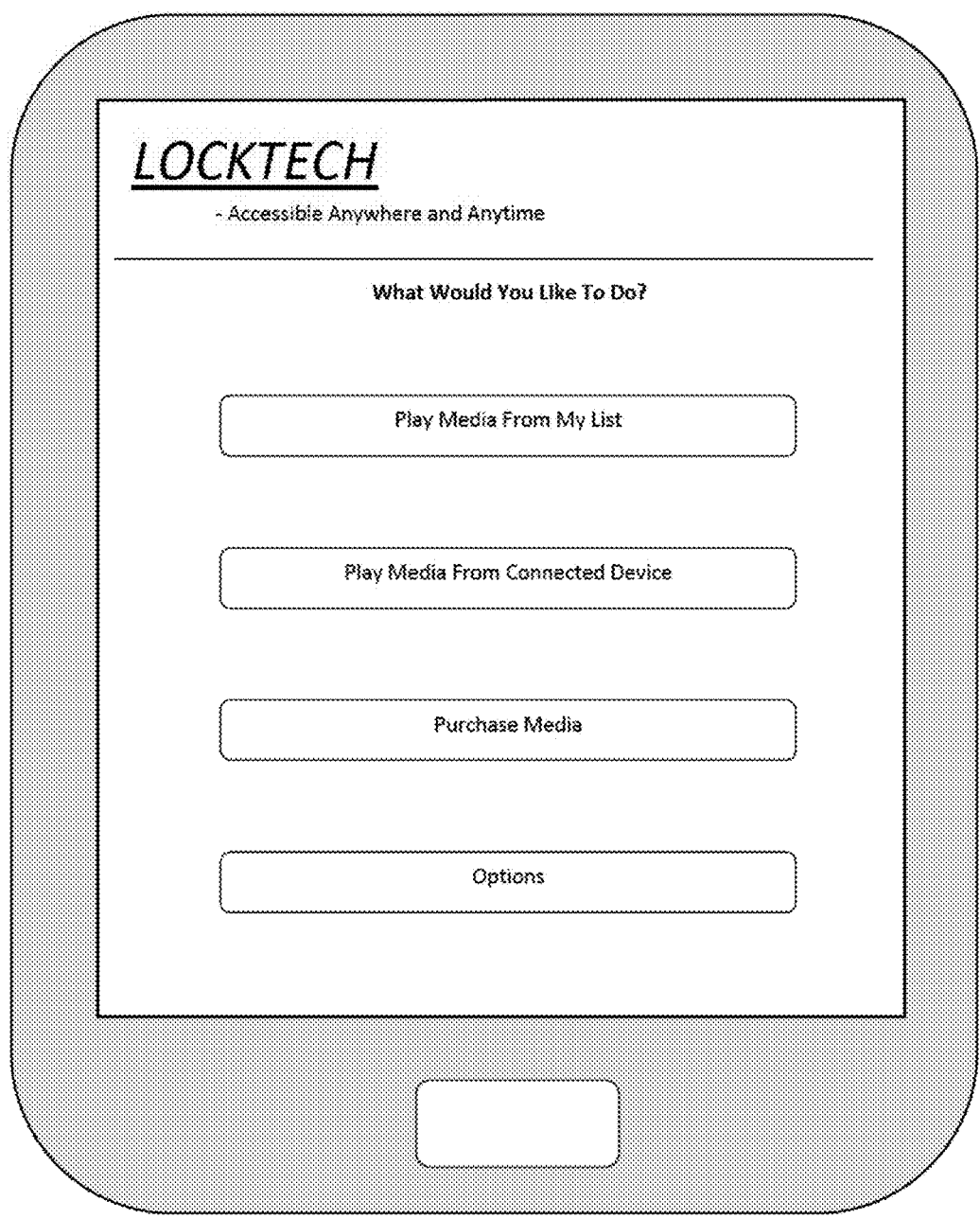
Figure 11C:
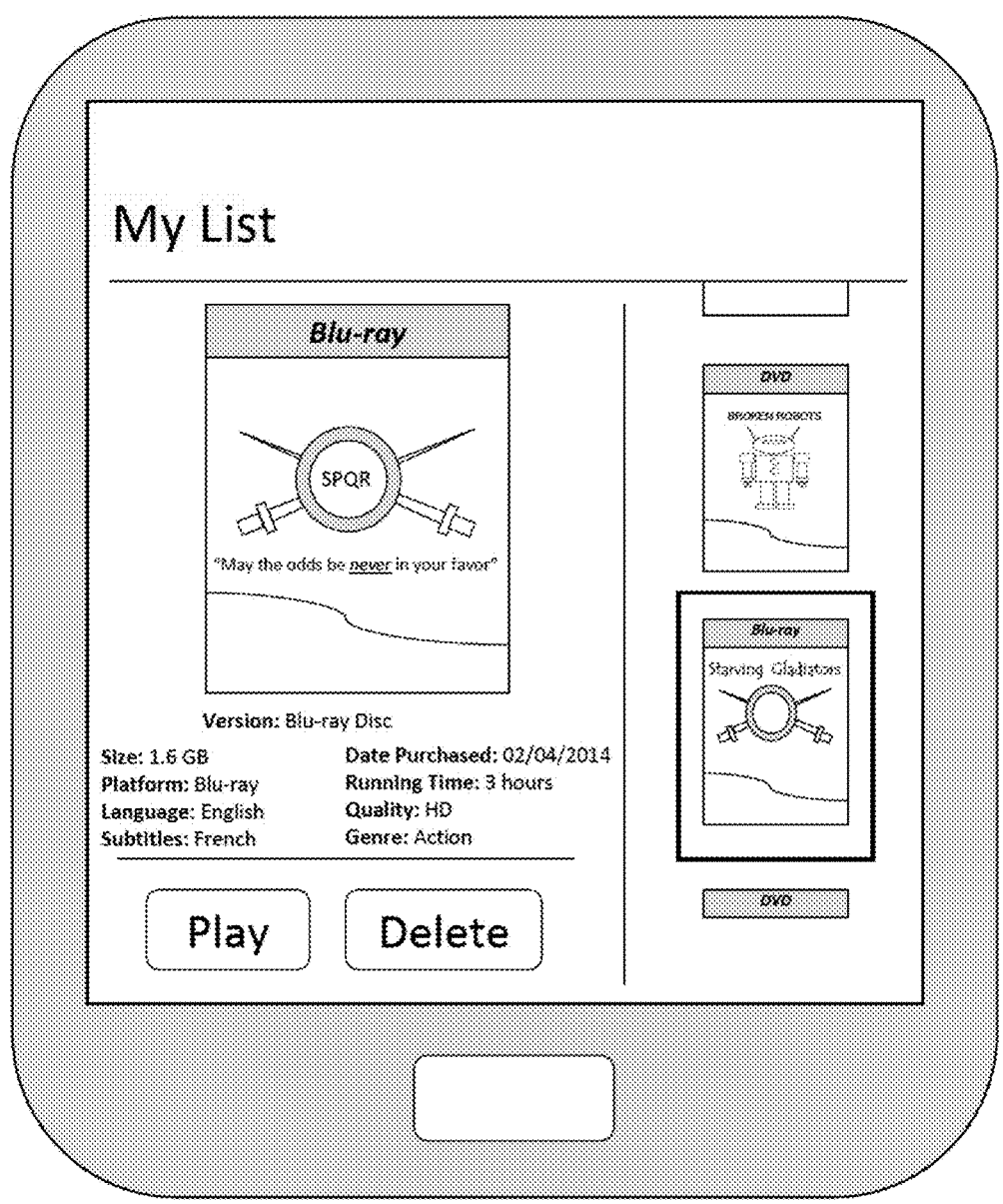

To facilitate this, the user is prompted by the terminal to log in to his or her account (S1001) as shown in FIG. 11A. Next, the user inputs his or her credentials to access the account (S1002). Afterwards, the terminal presents the user with a list of options as shown in FIG. 11B. It should be noted that these options may be similar to the options shown previously in FIG. 9B. Since the movie "Starving Gladiators" is already registered, the user selects to access media registered on his or her account (S1003). Next, the terminal displays a list containing every media that the user has registered to his or her account (S1004). The user may search through the list to find the content that he or she wishes to access. The user eventually finds the movie "Starving Gladiators" and selects it (S1005) which causes the terminal to display information about the movie to the user (S1006) as shown in FIG. 11C.

The information shown to the user may be properties of the movie such as its size, genre, rating, language, running quality, etc. The information may be provided to the user in order to assist the user in determining which movie version that he or she purchased. For example, there may be two versions of the movie "Starving Gladiators", one of which is on Standard Definition (SD) and the other on High Definition (HD) or one may be a director's cut and the other a theatrical version. Further, the user may have purchased both the SD and the HD version of the movie, but is looking to only to watch the HD version. Thus, the information presented to the user can greatly assist him or her.

Figure 11D:
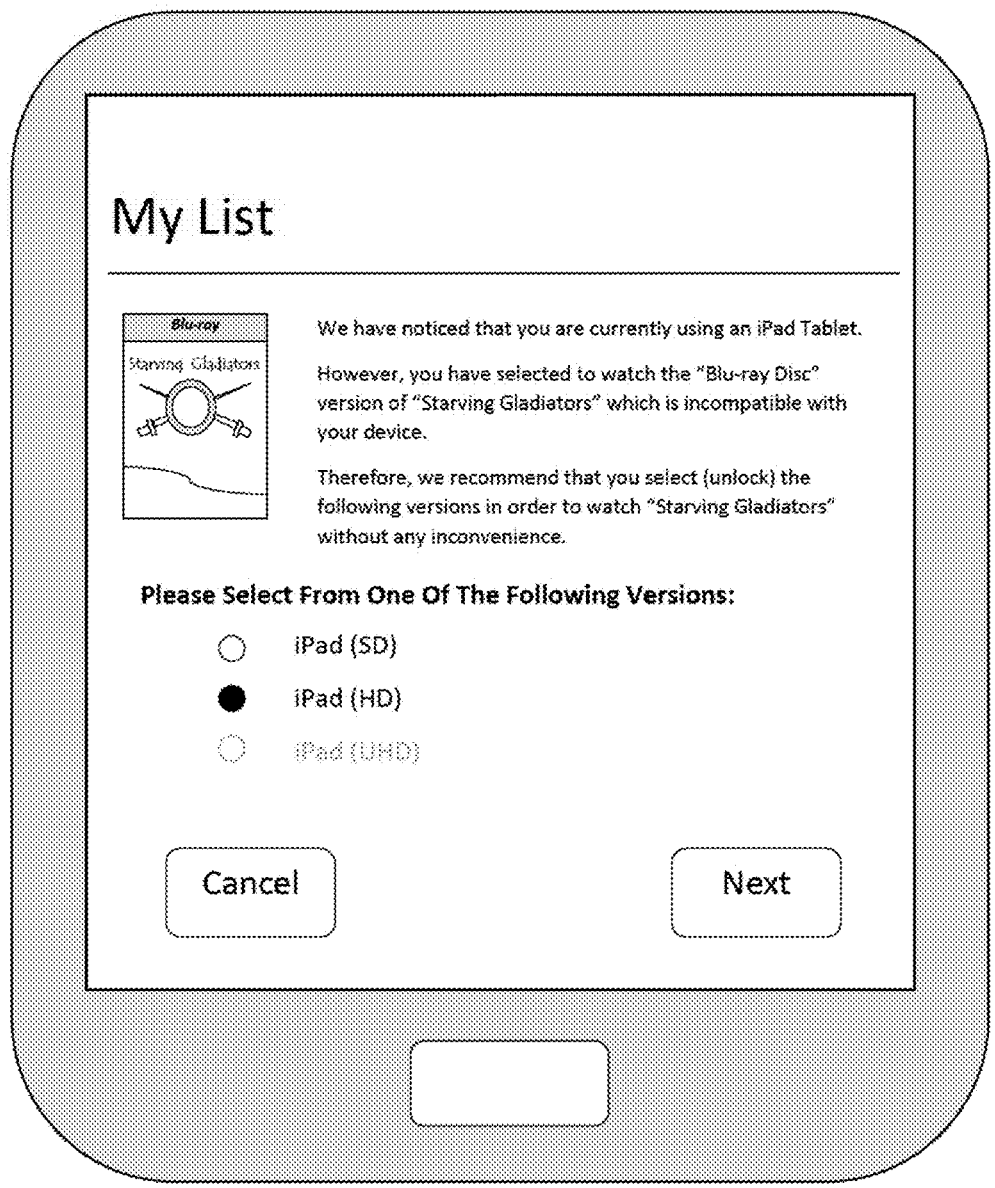

After the user has confirmed his or her selection, he or she may press the "Play" button to access the media (S1007). However, the user may be trying to watch the movie on an iPad lent to him or her by his or her sister. Since the user did not register a version of the movie "Starving Gladiators" for the iPad, he or she may be directed to select versions of the movie to watch as shown in FIG. 11D. As shown, the user has three choices to select from such as SD, HD and ultra-high definition (UHD). But, the user may have a version of the iPad that can only display media in SD or HD. As a result, the option for UHD is grayed out, preventing the user from selecting it. Nevertheless, the user decided to select that HD version of the movie.

In another exemplary embodiment, the riser may not be prompted to make a selection. For example, the server containing the user's digital locker account may simply let the user watch a version that is most suitable for his or her device. For example, the user may have set his or her iPad's aspect ratio or the bit rate (i.e. network connection speed) may be a certain value. As a result, the server may select the best or most suitable version of the movie for the user's iPad. Thus, the user may not need to waste time in thinking about which version to receive.

Thus, even though the movie "Starving Gladiators" was on a Blu-ray disc, it can be watched on any device once it is registered on the user's account. This is advantageous in that some devices such as smartphones or tablet computers do not possess an optical disc drive to insert certain recordable mediums such as discs. As a result, by allowing users to register media purchased on a disc format, the user may be able watch the media on any device regardless of whether or not that device is able to play the media in its original purchased format.

Figure 8:
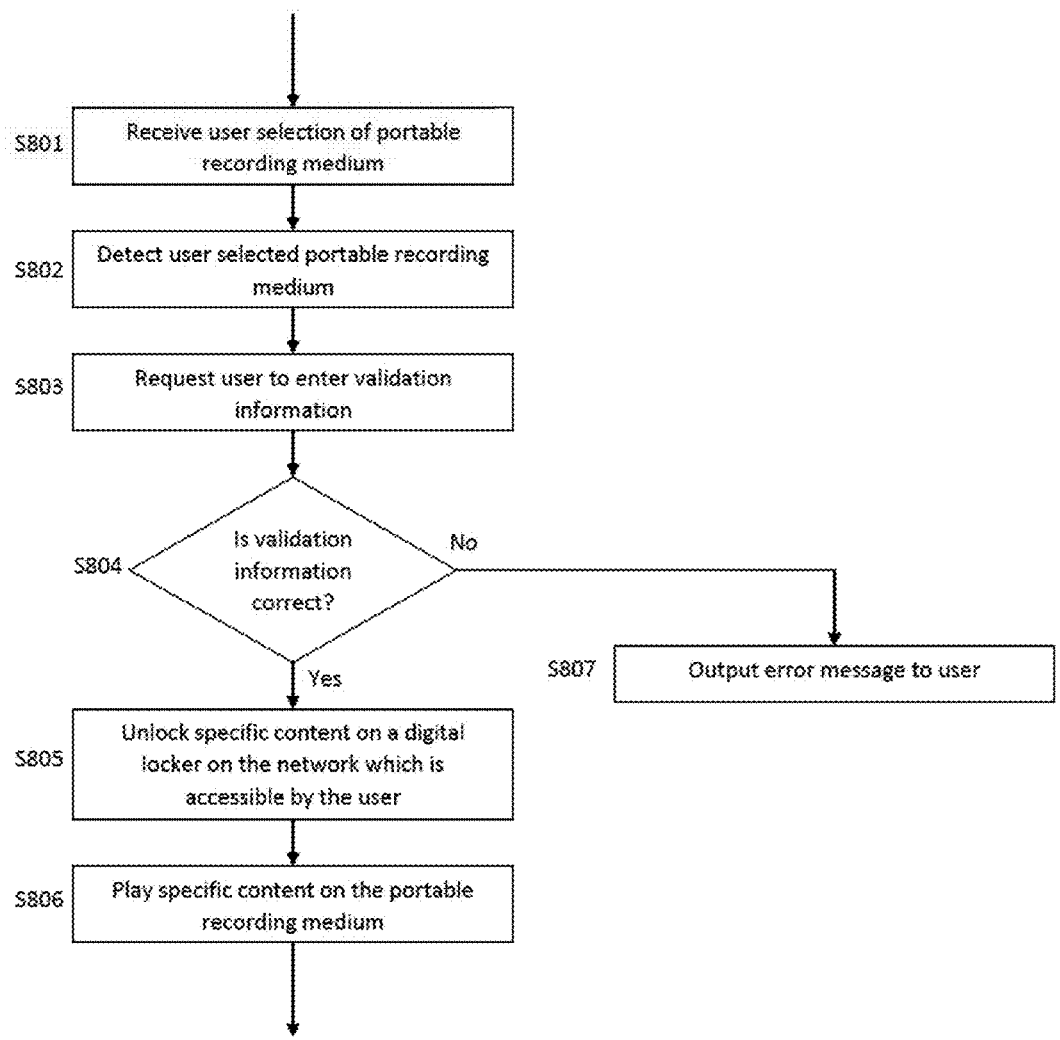
FIG. 8 shows a flow chart of a method performed by a media player configured, according to an exemplary embodiment, to register content on a portable recording medium to a digital locker.
Figure 9P:
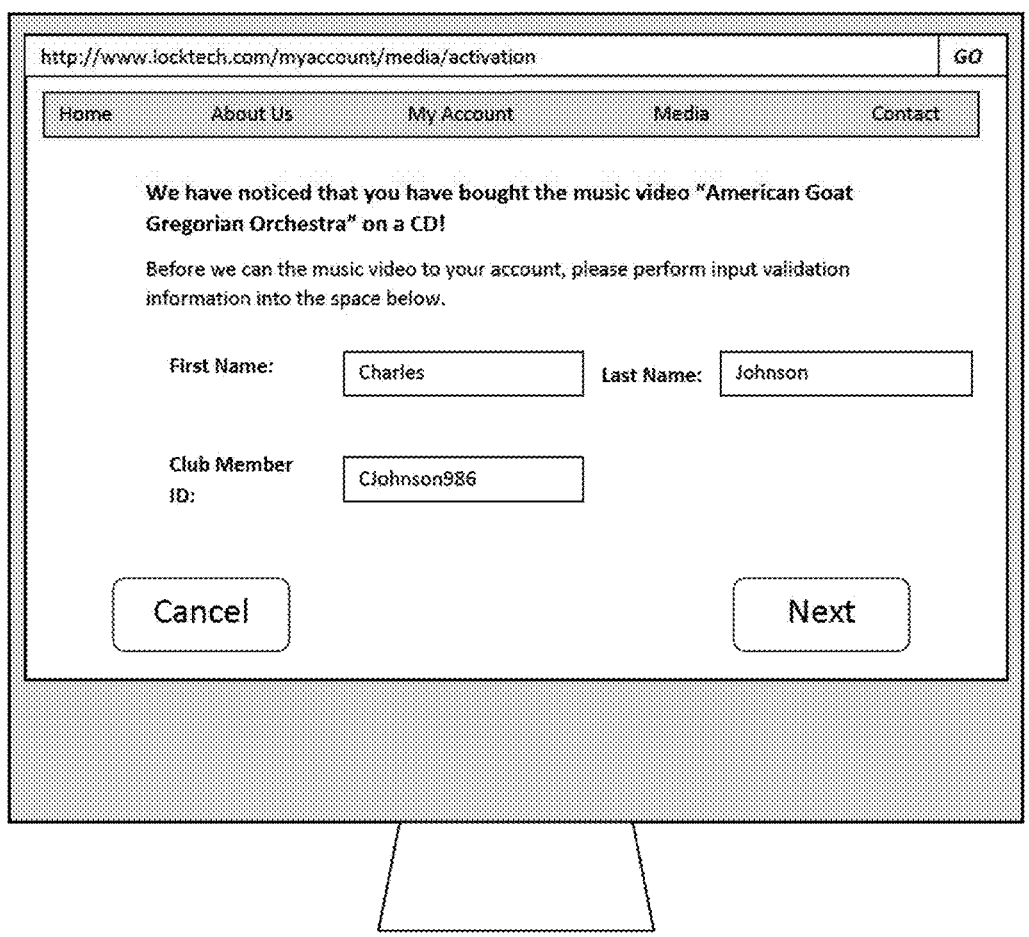

The orders in which the steps are performed in the aforementioned methods are not limited to those shown in the examples of FIGS. 8 and 10, and may be switched as long as similar results are achieved. Also, it should be noted that the methods illustrated in the examples of FIGS. 8 and 10 may be implemented using any of the systems described in connection with FIG. 4.

The aforementioned specific embodiments are illustrative, and many variations can be introduced on these embodiments without departing from the spirit of the disclosure or from the scope of the appended claims. For example, although the portable recording medium 101 shown in FIG. 1 is explained herein by reference to optical discs (such as DVD or Blu-ray disc), it should be appreciated to the various features described herein can be embodied in another recording medium, such as a USB flash drive, SD or micro SD card, etc., or even a portable device including an embedded recording medium capable of retaining content for future use, playback, etc., such as games, videos, audio files, text documents, spreadsheets, databases, etc. Further, the content may be in any of a variety of file formats (mkv, wmv, mp3, mpg4, etc.).

Further, elements and/or features of different examples and illustrative embodiments may be combined with each other and/or substituted for each other within the scope of this disclosure and appended claims.

This disclosure is based on U.S. Provisional Application No. 61/980,945 filed on Apr. 17, 2014 and U.S. Provisional Application No. 61/988,653 filed on May 5, 2014, each entitled "REGISTERING CONTENT TO A DIGITAL LOCKER", and the entire contents of each of which are incorporated herein by reference.

What is claimed is:

1. A portable non-transitory recording medium comprising one or more content storage portions wherein said portable non-transitory recording medium stores a content access application that performs a method to facilitate access to specific content stored on said one or more content storage portions of the portable non-transitory recording medium, said method being performed by the content access application once said portable non-transitory recording medium is inserted in a terminal and comprising:
   requesting an entry of access validation information associated with the specific content, from a user interface of said terminal; and
   upon a validation based on the entered access validation information, requesting registration, in a network-accessible digital locker, of an indication that the specific content is activated for access upon entry of credentials and an indication of one or more terminal platforms on which the specific content can be accessed.

2. The portable non-transitory recording medium of claim 1, wherein the entered access validation information includes an identifier unique to the portable non-transitory recording medium.

3. The portable non-transitory recording medium of claim 2, wherein the unique identifier appears on the portable non-transitory recording medium.

4. The portable non-transitory recording medium of claim 2, wherein the unique identifier is a serial identifier written on a burst cutting area of the recording medium.

5. The portable non-transitory recording medium of claim 1, wherein the method performed by the content access application further comprises upon said requesting of registration, reproducing the specific content on said terminal.

6. The portable non-transitory recording medium of claim 1, wherein upon said requesting of registration, the specific content is retrievable from the network-accessible digital locker upon entry of said credentials.

7. The portable non-transitory recording medium of claim 6, wherein the specific content stored in said one or more content storage portions is available to be reproduced even before said entry of the access validation information associated with the specific content.

8. The portable non-transitory recording medium of claim 6, wherein upon said requesting of registration, the specific content is unlocked for reproduction from the network-accessible digital locker upon entry of said credentials.

9. The portable non-transitory recording medium of claim 1, wherein the specific content is stored on the portable non-transitory recording medium and can be reproduced from the recording medium even without said requesting of registration.

10. The portable non-transitory recording medium of claim 1, wherein the method performed by the content access application further comprises
requesting registration in the digital locker, upon validation, a link to a specific content to retrieve the specific content in a format usable by a terminal having one of the registered terminal platforms.

11. The portable non-transitory recording medium of claim 1, wherein the specific content registered in the digital locker can be activated for additional platforms, in addition to said one or more terminal platforms.

12. A method performed on a terminal, to facilitate access to at least one specific content stored on one or more content storage portions of a portable non-transitory recording medium readable by said terminal, said method comprising:
requesting an entry of access validation information associated with the specific content, from a user interface of said terminal; and
upon a validation based on the entered access validation information, requesting registration, in a network-accessible digital locker, of an indication that the specific content is activated for access upon entry of credentials and an indication of one or more terminal platforms on which the specific content can be accessed,
wherein said method is performed by a software application executed on said terminal once said portable non-transitory recording medium is inserted in said terminal, said software application being stored on said portable non-transitory recording medium.

13. The method according to claim 12, wherein the specific content stored on one or more content storage portions is available to be reproduced even before said entry of the access validation information associated with the specific content.

14. The method according to claim 12, wherein said method further comprises
requesting registration, in the digital locker, upon said validation, of a link to a specific content to retrieve the specific content in a format usable by a terminal having one or more registered terminal platforms.

15. The method according to claim 12, wherein the specific content registered in the digital locker can be activated for additional platforms, in addition to said one or more terminal platforms.

16. A terminal comprising at least one circuitry adapted to facilitate access to at least one specific content stored on a portable non-transitory recording medium readable by said terminal, said circuitry being adapted to execute a software application stored on said portable non-transitory recording medium once said portable non-transitory recording medium is inserted in said terminal in order to:
request an entry of access validation information associated with the specific content, on a user interface of said terminal, and
upon obtaining a validation based on the entered access validation information, requesting registration, in a network-accessible digital locker, of an indication that the specific content is activated for access upon entry of credentials and an indication of one or more terminal platforms on which the specific content can be accessed.

* * * * *